(12) United States Patent
Hochwarth et al.

(10) Patent No.: US 7,840,175 B2
(45) Date of Patent: Nov. 23, 2010

(54) METHOD AND SYSTEM FOR CHANGING LEARNING STRATEGIES

(75) Inventors: Christian Hochwarth, Wiesloch (DE); Andreas S. Krebs, Karlsruhe (DE); Martin Erhard, Karlsruhe (DE); Marcus Philipp, Dielheim (DE)

(73) Assignee: S&P Aktiengesellschaft, Walldorf ( * ) Notice: Subject to any disclaimer, the term of this patent is extended or adjusted under 35 U.S.C. 154(b) by 395 days.

(21) Appl. No.: 11/257,584

(22) Filed: Oct. 24, 2005

(65) Prior Publication Data

US 2007/0111179 A1 May 17, 2007

(51) Int. Cl.
G09B 3/00 (2006.01)
(52) U.S. Cl. .................. 434/362; 434/322; 434/350
(58) Field of Classification Search ............... 434/350, 434/322
See application file for complete search history.

(56) References Cited

U.S. PATENT DOCUMENTS

| | | |
|---|---|---|
| 4,599,692 A | 7/1986 | Tan et al. |
| 5,008,853 A | 4/1991 | Bly et al. |
| 5,310,349 A | 5/1994 | Daniels et al. |
| 5,395,243 A | 3/1995 | Lubin et al. |
| 5,584,699 A | 12/1996 | Silver |
| 5,623,661 A | 4/1997 | Hon |
| 5,675,802 A | 10/1997 | Allen et al. |
| 5,692,125 A | 11/1997 | Schloss et al. |
| 5,727,950 A | 3/1998 | Cook et al. |
| 5,788,508 A | 8/1998 | Lee et al. |
| 5,802,514 A | 9/1998 | Huber |
| 5,810,605 A * | 9/1998 | Siefert ............... 434/362 |
| 5,820,386 A | 10/1998 | Sheppard, II |
| 5,823,781 A | 10/1998 | Hitchcock et al. |
| 5,852,812 A | 12/1998 | Reeder |
| 5,864,869 A | 1/1999 | Doak et al. |
| 5,881,315 A | 3/1999 | Cohen |
| 6,011,949 A | 1/2000 | Shimomukai |
| 6,014,134 A | 1/2000 | Bell et al. |
| 6,029,043 A | 2/2000 | Ho et al. |
| 6,091,930 A | 7/2000 | Mortimer et al. |
| 6,099,320 A | 8/2000 | Papadopoulos |
| 6,112,049 A | 8/2000 | Sonnenfeld |

(Continued)

FOREIGN PATENT DOCUMENTS

EP 1071253 1/2001

(Continued)

OTHER PUBLICATIONS

Eugster, Patrick, et al., "Distributed Asynchronous Collections: Abstractions for Publish/Subscribe Interaction," XP-002171795, Agilent Laboratories, Edinburgh, Jan. 10, 2000, pp. 1-34.

(Continued)

*Primary Examiner*—Cameron Saadat
(74) *Attorney, Agent, or Firm*—Fish & Richardson P.C.

(57) ABSTRACT

A method for changing learning strategies includes presenting a training course to a learner in order based on a learning strategy. A disparate learning strategy is received from the learner specific to the training course. The disparate learning strategy is applied to the training course. The training course is presented to the learner in order based on the disparate learning strategy.

19 Claims, 10 Drawing Sheets

U.S. PATENT DOCUMENTS

| | | | |
|---|---|---|---|
| 6,118,973 A * | 9/2000 | Ho et al. | 434/362 |
| 6,134,552 A | 10/2000 | Fritz et al. | |
| 6,148,338 A | 11/2000 | Lachelt et al. | |
| 6,149,438 A | 11/2000 | Richard et al. | |
| 6,149,441 A | 11/2000 | Pellegrino et al. | |
| 6,157,808 A | 12/2000 | Hollingsworth | |
| 6,162,060 A | 12/2000 | Richard et al. | |
| 6,164,974 A | 12/2000 | Carlile et al. | |
| 6,175,841 B1 | 1/2001 | Loiacono | |
| 6,195,528 B1 | 2/2001 | Young et al. | |
| 6,243,692 B1 | 6/2001 | Floyd et al. | |
| 6,285,993 B1 * | 9/2001 | Ferrell | 706/45 |
| 6,302,698 B1 | 10/2001 | Ziv-El | |
| 6,315,572 B1 | 11/2001 | Owens et al. | |
| 6,322,366 B1 | 11/2001 | Bergan et al. | |
| 6,336,813 B1 | 1/2002 | Siefert | |
| 6,341,291 B1 | 1/2002 | Bentley et al. | |
| 6,347,333 B2 | 2/2002 | Eisendrath et al. | |
| 6,347,943 B1 | 2/2002 | Fields et al. | |
| 6,353,447 B1 | 3/2002 | Truluck et al. | |
| 6,368,110 B1 | 4/2002 | Koenecke et al. | |
| 6,370,355 B1 | 4/2002 | Ceretta et al. | |
| 6,381,444 B1 | 4/2002 | Aggarwal et al. | |
| 6,386,883 B2 | 5/2002 | Siefert | |
| 6,397,036 B1 | 5/2002 | Thean et al. | |
| 6,398,556 B1 | 6/2002 | Ho et al. | |
| 6,409,514 B1 | 6/2002 | Bull | |
| 6,430,563 B1 | 8/2002 | Fritz et al. | |
| 6,470,171 B1 | 10/2002 | Helmick et al. | |
| 6,471,521 B1 | 10/2002 | Dornbush et al. | |
| 6,473,794 B1 | 10/2002 | Guheen et al. | |
| 6,505,031 B1 | 1/2003 | Slider et al. | |
| 6,514,085 B2 | 2/2003 | Slattery et al. | |
| 6,527,556 B1 | 3/2003 | Koskinen | |
| 6,546,230 B1 | 4/2003 | Allison | |
| 6,587,668 B1 | 7/2003 | Miller et al. | |
| 6,606,480 B1 | 8/2003 | L'Allier et al. | |
| 6,622,003 B1 | 9/2003 | Denious et al. | |
| 6,633,742 B1 | 10/2003 | Turner et al. | |
| 6,643,493 B2 | 11/2003 | Kilgore | |
| 6,652,283 B1 | 11/2003 | Van Schaack et al. | |
| 6,662,003 B2 | 12/2003 | Elder et al. | |
| 6,674,992 B2 | 1/2004 | Helmick et al. | |
| RE38,432 E | 2/2004 | Fai et al. | |
| 6,688,891 B1 | 2/2004 | Sanford | |
| 6,701,125 B1 | 3/2004 | Lohse | |
| 6,709,330 B1 | 3/2004 | Klein et al. | |
| 6,711,378 B2 | 3/2004 | Kashima | |
| 6,729,885 B2 | 5/2004 | Stuppy et al. | |
| 6,766,311 B1 | 7/2004 | Wall et al. | |
| 6,801,751 B1 | 10/2004 | Wood et al. | |
| 6,802,054 B2 | 10/2004 | Faraj | |
| 6,827,578 B2 | 12/2004 | Krebs et al. | |
| 6,884,074 B2 | 4/2005 | Theilmann | |
| 6,905,883 B1 | 6/2005 | Olmstead | |
| 6,978,115 B2 * | 12/2005 | Whitehurst et al. | 434/350 |
| 6,988,138 B1 | 1/2006 | Alcorn et al. | |
| 7,058,354 B2 | 6/2006 | McCormick et al. | |
| 7,110,989 B2 | 9/2006 | Iemoto et al. | |
| 7,162,473 B2 | 1/2007 | Dumais et al. | |
| 7,237,189 B2 | 6/2007 | Altenhofen et al. | |
| 2001/0044728 A1 | 11/2001 | Freeman et al. | |
| 2001/0047310 A1 | 11/2001 | Russell | |
| 2002/0006603 A1 | 1/2002 | Peterson et al. | |
| 2002/0042041 A1 | 4/2002 | Owens et al. | |
| 2002/0049788 A1 | 4/2002 | Lipkin et al. | |
| 2002/0061506 A1 | 5/2002 | Catten et al. | |
| 2002/0064766 A1 | 5/2002 | Cozens et al. | |
| 2002/0073236 A1 | 6/2002 | Helgeson et al. | |
| 2002/0086267 A1 | 7/2002 | Birkhoelzer et al. | |
| 2002/0138841 A1 | 9/2002 | Ward | |
| 2002/0142278 A1 | 10/2002 | Whitehurst et al. | |
| 2002/0168621 A1 | 11/2002 | Cook et al. | |
| 2002/0174021 A1 | 11/2002 | Chu et al. | |
| 2002/0188583 A1 | 12/2002 | Rukavina et al. | |
| 2003/0013073 A1 | 1/2003 | Duncan et al. | |
| 2003/0046265 A1 | 3/2003 | Orton et al. | |
| 2003/0049593 A1 | 3/2003 | Parmer et al. | |
| 2003/0055699 A1 | 3/2003 | O'Connor | |
| 2003/0073063 A1 | 4/2003 | Dattaray et al. | |
| 2003/0073065 A1 | 4/2003 | Riggs | |
| 2003/0074320 A1 | 4/2003 | Riggs | |
| 2003/0074559 A1 | 4/2003 | Riggs | |
| 2003/0082508 A1 | 5/2003 | Barney | |
| 2003/0113700 A1 | 6/2003 | Simon | |
| 2003/0129575 A1 | 7/2003 | L'Allier et al. | |
| 2003/0129576 A1 | 7/2003 | Wood et al. | |
| 2003/0151629 A1 | 8/2003 | Krebs et al. | |
| 2003/0152899 A1 * | 8/2003 | Krebs et al. | 434/350 |
| 2003/0152900 A1 | 8/2003 | Krebs et al. | |
| 2003/0152901 A1 * | 8/2003 | Altenhofen et al. | 434/350 |
| 2003/0152902 A1 * | 8/2003 | Altenhofen et al. | 434/350 |
| 2003/0152904 A1 | 8/2003 | Doty, Jr. | |
| 2003/0152905 A1 | 8/2003 | Altenhofen et al. | |
| 2003/0154176 A1 | 8/2003 | Krebs et al. | |
| 2003/0157470 A1 * | 8/2003 | Altenhofen et al. | 434/350 |
| 2003/0163784 A1 | 8/2003 | Daniel et al. | |
| 2003/0175664 A1 | 9/2003 | Frangenheim et al. | |
| 2003/0175676 A1 * | 9/2003 | Theilmann et al. | 434/350 |
| 2003/0180702 A1 | 9/2003 | Kamikawa et al. | |
| 2003/0194690 A1 * | 10/2003 | Wessner et al. | 434/350 |
| 2003/0195946 A1 | 10/2003 | Yang | |
| 2003/0207245 A1 | 11/2003 | Parker | |
| 2003/0211447 A1 | 11/2003 | Diesel et al. | |
| 2003/0224339 A1 | 12/2003 | Jain et al. | |
| 2003/0232318 A1 | 12/2003 | Altenhofen et al. | |
| 2004/0010629 A1 | 1/2004 | Diesel et al. | |
| 2004/0076941 A1 | 4/2004 | Cunningham et al. | |
| 2004/0081951 A1 | 4/2004 | Vigue et al. | |
| 2004/0086833 A1 | 5/2004 | Goldberg | |
| 2004/0110119 A1 | 6/2004 | Riconda et al. | |
| 2004/0133437 A1 | 7/2004 | Draper et al. | |
| 2004/0153440 A1 | 8/2004 | Halevy et al. | |
| 2004/0202987 A1 | 10/2004 | Scheuring et al. | |
| 2004/0210461 A1 | 10/2004 | Bohle | |
| 2004/0229199 A1 | 11/2004 | Ashley et al. | |
| 2004/0259068 A1 * | 12/2004 | Philipp et al. | 434/350 |
| 2005/0014121 A1 * | 1/2005 | Eck et al. | 434/350 |
| 2005/0131970 A1 | 6/2005 | Salazar et al. | |
| 2005/0154699 A1 | 7/2005 | Lipkin et al. | |
| 2005/0188297 A1 | 8/2005 | Knight et al. | |
| 2005/0202392 A1 | 9/2005 | Allen et al. | |
| 2005/0223318 A1 | 10/2005 | Diesel et al. | |
| 2005/0227216 A1 | 10/2005 | Gupta | |
| 2006/0008789 A1 * | 1/2006 | Gerteis | 434/365 |
| 2007/0111181 A1 * | 5/2007 | Hochwarth et al. | 434/350 |

FOREIGN PATENT DOCUMENTS

| | | | |
|---|---|---|---|
| GB | 2373625 A | | 9/2002 |
| WO | 98/53384 | | 11/1998 |
| WO | WO 99/09490 | | 2/1999 |
| WO | 00/54128 | | 9/2000 |
| WO | WO 02/21379 A1 | | 3/2002 |
| WO | WO 02/073442 A1 | | 9/2002 |

OTHER PUBLICATIONS

Shiroshita, Teruji, et al., "*A Large-Scale Contents Distribution Architecture Based on Reliable Multicast,*" XP 10365597, Proceedings Internet Workshop, 1999, IWS '99, Osaka, Japan, Feb. 18-20, 1999, pp. 75-80.

Chappell, David, "*Asynchronous Web Services and the Enterprise Service Bus,*" May 6, 2002, 5 pgs. <http://www.webservices.org>, site visited Dec. 4, 2006.

Siekmann, Jörg et al., "Adaptive Course Generation and Presentation," ITS Workshop on Adaptive and Intelligent Web-Based Foundation System, Montreal, The Omega Group; pp. 1-10, 2000.

Lai Jin et al., "An Ontology-Aware Authoring Tool —Functional structure and guidance generation," Proceedings of AIED '99, pp. 85-92, LeManns France, 1999.

Dietrich, Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 3 pgs., 1997.

Ranwez, Sylvie et al., "Description and Construction of Pedagogical Material using an Ontology based DTD," AIED '99 Workshop 2 proceedings "Ontologies for Intelligent Educational Systems", pp. 1-4, 1999.

Jungmann, Michael et al., "Adaptive Hypertext in Complex Information Spaces," Daimler-Benz Research & Technology, Technical University of Ilmenau, pp. 1-5, Mar. 8, 1997.

Henze, Nicola et al.,"Modeling Constructivist Teaching Functionality and Structure in the KBS Hyperbook System," University of Hannover, pp. 1-12, Jun. 4, 1999.

Mühlhäuser, Max , "Cooperative Computer-Aided Authoring and Learning," University of Karlsruhe, pp. 107-130, 145-161, 165-192, 273-291, 293-318, 1995.

Paaso, Professor Jouko , "A New Environment for Courseware Development, Course Delivery and Training," Proceedings of the ED-Media 97, Toronto, 1997, 10 pages.

Sun Microsystems, "Developing Web Services with SUN™ Open Network Environment," Mar. 2002, [online], [retrieved from the Internet Mar. 24, 2004: http:wwws.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

x.hlp, "Software for faster learning," http://www.xhlp.com/home.cfm, Apr. 2003, 7 pgs.

Global Knowledge Network, Inc., "On Demand Personal Navigator," http://kp.globalknowledge.com/products/od/index.asp, Sep. 2002, 2 pgs.

Hewlett Packard, "HP OpenView Integration Guide for Developers," Jul. 2002, [online], [retrieved from the Internet on Mar. 24, 2004: http://h21007.www2.hp.com/dspp/files/unprotected/OpenVie w/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Notice of Allowance issued in U.S. Appl. No. 11/258,591, filed Sep. 17, 2008; 4 pages.

Advisory Action issued in U.S. Appl. No. 11/258,591, filed Jun. 20, 2008; 3 pages.

Office Action issued in U.S. Appl. No. 11/258,591, filed Mar. 26, 2008; 8 pages.

Office Action issued in U.S. Appl. No. 11/258,591, filed Oct. 5, 2007; 8 pages.

Office Action issued in U.S. Appl. No. 11/258,520, filed Nov. 30, 2009; 24 pages.

Advisory Action issued in U.S. Appl. No. 11/258,520, filed Sep. 23, 2009; 3 pages.

Office Action issued in U.S. Appl. No. 11/258,520, filed Jul. 22, 2009; 21pages.

Office Action issued in U.S. Appl. No. 11/258,520, filed Jan. 14, 2009; 14 pages.

Office Action issued in U.S. Appl. No. 11/257,587, filed Mar. 4, 2010; 11 pages.

Office Action issued in U.S. Appl. No. 11/257,587, filed Aug. 20, 2009; 9 pages.

Office Action issued in U.S. Appl. No. 11/257,587, filed May 1, 2009; 8 pages.

Office Action issued in U.S. Appl. No. 11/257,587, filed Dec. 1, 2008; 9 pages.

Advisory Action issued in U.S. Appl. No. 11/301,595, filed Mar. 29, 2010; 3 pages.

Office Action issued in U.S. Appl. No. 11/301,595, filed Jan. 25, 2010; 21 pages.

Office Action issued in U.S. Appl. No. 11/301,595, filed Jun. 25, 2009; 13 pages.

Office Action issued in U.S. Appl. No. 11/258,457, filed Mar. 17, 2010; 7 pages.

Office Action issued in U.S. Appl. No. 11/258,457, filed Dec. 24, 2008.

Office Action issued in U.S. Appl. No. 11/258,527, filed Apr. 5, 2010; 19 pages.

Office Action issued in U.S. Appl. No. 11/258,527, filed Oct. 2, 2009; 20 pages.

Advisory Action issued in U.S. Appl. No. 11/258,527, filed Jul. 2, 2009; 3 pages.

Office Action issued in U.S. Appl. No. 11/258,527, filed May 1, 2009; 14 pages.

Office Action issued in U.S. Appl. No. 11/258,527, filed Dec. 29, 2008; 14 pages.

Office Action issued in U.S. Appl. No. 11/257,585, filed Dec. 18, 2009; 10 pages.

Advisory Action issued in U.S. Appl. No. 11/257,585, filed Sep. 23, 2009; 3 pages.

Office Action issued in U.S. Appl. No. 11/257,585, filed Aug. 3, 2009; 12 pages.

Office Action issued in U.S. Appl. No. 11/257,585, filed Jan. 28, 2009; 10 pages.

Advisory Action issued in U.S. Appl. No. 11/257,585, filed Oct. 31, 2008; 3 pages.

Office Action issued in U.S. Appl. No. 11/257,585, filed Sep. 5, 2008; 11 pages.

Office Action issued in U.S. Appl. No. 11/257,585, filed Mar. 24, 2008; 8 pages.

Office Action issued in U.S. Appl. No. 11/257,589, filed Jan. 7, 2010; 8 pages.

Advisory Action issued in U.S. Appl. No. 11/257,589, filed Sep. 17, 2009; 3 pages.

Office Action issued in U.S. Appl. No. 11/257,589, filed Jun. 26, 2009; 10 pages.

Advisory Action issued in U.S. Appl. No. 11/257,589, filed Jun. 3, 2009; 3 pages.

Office Action issued in U.S. Appl. No. 11/257,589, Apr. 3, 2009; 7 pages.

Office Action issued in U.S. Appl. No. 11/257,589, filed Nov. 14, 2008; 9 pages.

Advisory Action issued in U.S. Appl. No. 11/374,497, filed Apr. 8, 2009; 3 pages.

Office Action issued in U.S. Appl. No. 11/374,497, filed Jan. 28, 2009; 13 pages.

Office Action issued in U.S. Appl. No. 11/374,497, filed Sep. 3, 2008; 13 pages.

Cisco Systems; "Cisco System—Reusable Information Object Strategy Definition, Creation Overview, and Guidelines"; Version 3.0; Jun. 25, 1999.

* cited by examiner

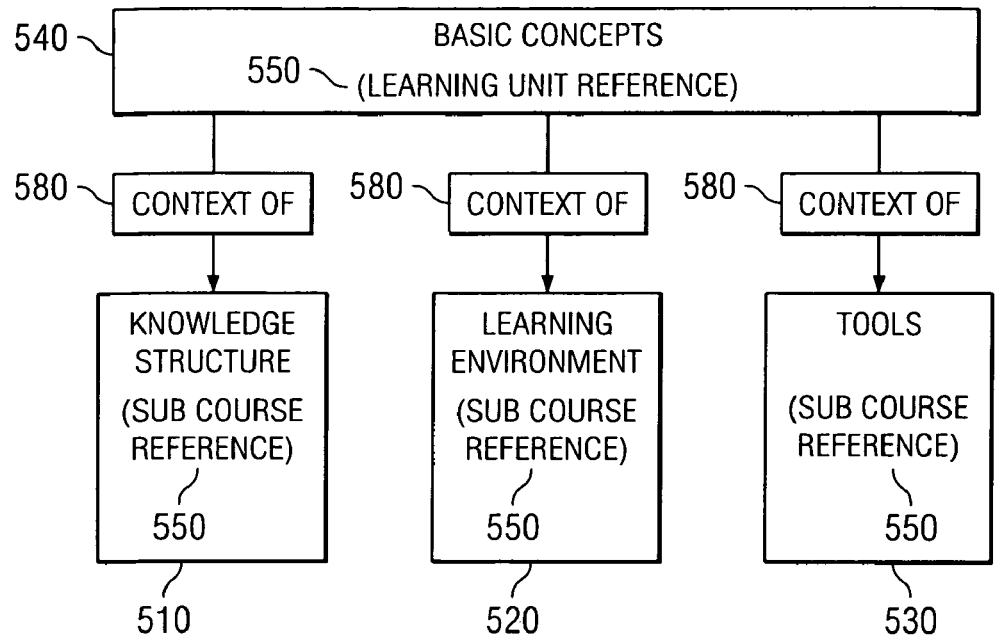
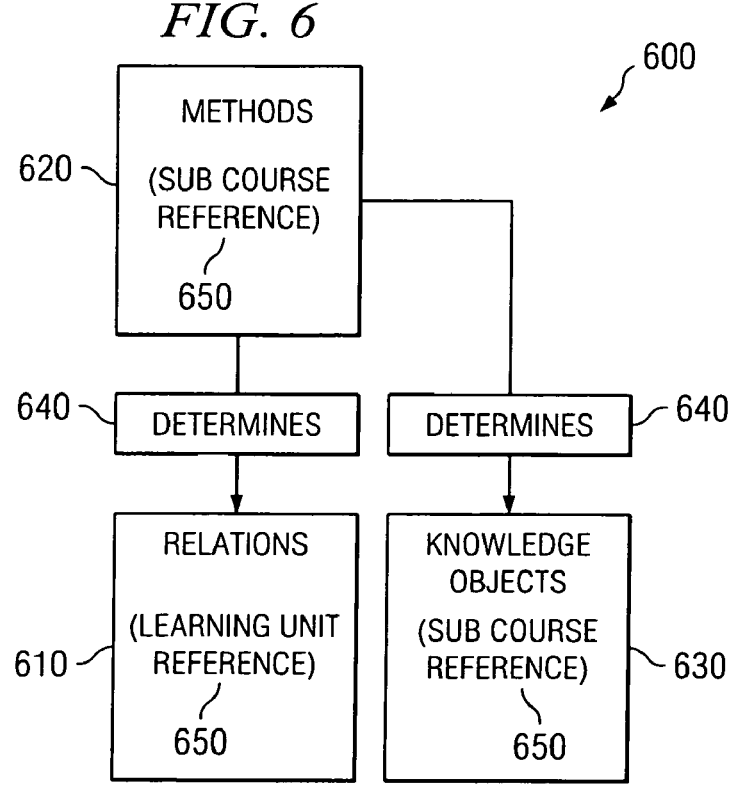

*FIG. 9C*

Data Browser: Tabelle LSOLUPUBL_STRAT    34 Treffer

Tabelleneintrag  Bearbeiten  Springen  Einstellungen  Hilfsmittel  Umfeld  System  Hilfe Tabelle:    LOSLUPUBL_STRAT
Angezeigte Felder: 6 von 6   Feststehende Fuhrungsspalten: 4   Listbreite: 0250

| | MANDT | LUPIIO | MACID | MICID | MACSTRATID | MICSTRATID |
|---|---|---|---|---|---|---|
| ☐ | 000 | 10006E65C0689A0 | 06 | 05 | mac_bottomup_lin | mic_orient_only |
| ☐ | 000 | 10006E6BEE23688 | 07 | 07 | mac_scorm | mic_scorm |
| ☐ | 000 | 10006E6BEF74775 | 06 | 05 | mac_bottomup_lin | mic_orient_only |
| ☐ | 000 | 10006E6BEF74775 | 07 | 07 | mac_scorm | mic_scorm |
| ☐ | 000 | 1000766B410CFBC | 04 | 03 | mac_index_lin | mic_explan_orient |
| ☐ | 000 | 1000766ACB12B48 | 02 | 03 | mac_topdown | mic_explan_orient |
| ☐ | 000 | 76A3ED995B97A2C0 | 06 | 05 | mac_bottomup_lin | mic_orient_only |
| ☐ | 000 | 76A3ED995B97A2C0 | 07 | 07 | mac_scorm | mic_scorm |
| ☐ | 000 | B9A3ED980661EFBF | 02 | 01 | mac_topdown | mic_action_orient |
| ☐ | 000 | B9A3ED980661EFBF | 02 | 03 | mac_topdown | mic_explan_orient |
| ☐ | 000 | B9A3ED980661EFBF | 06 | 05 | mac_bottomup_lin | mic_orient_only |
| ☐ | 000 | B9A3ED9806717AB8 | 06 | 05 | mac_bottomup_lin | mic_orient_only |
| ☐ | 000 | B9A3ED9806717AB8 | 07 | 07 | mac_scorm | mic_scorm |
| ☐ | 000 | B9A3ED98542D5586 | 02 | 01 | mac_topdown | mic_action_orient |
| ☐ | 000 | B9A3ED98542D5586 | 02 | 03 | mac_topdown | mic_explan_orient |
| ☐ | 000 | B9A3ED98542D5586 | 04 | 03 | mac_index_lin | mic_explan_orient |
| ☐ | 000 | B9A3ED98542D5586 | 06 | 05 | mac_bottomup_lin | mic_orient_only |
| ☐ | 000 | B9A3ED98545E70F0 | 02 | 01 | mac_topdown | mic_action_orient |
| ☐ | 000 | B9A3ED98545E70F0 | 02 | 03 | mac_topdown | mic_explan_orient |
| ☐ | 000 | B9A3ED98545E70F0 | 04 | 03 | mac_index_lin | mic_explan_orient |
| ☐ | 000 | B9A3ED9854B79871 | 02 | 01 | mac_topdown | mic_action_orient |

AEN(1)(000)   us4214   INS   13:38

METHOD AND SYSTEM FOR CHANGING LEARNING STRATEGIES

TECHNICAL FIELD

The present disclosure relates generally to learning systems and, more particularly, to a method and system for changing learning strategies.

BACKGROUND

Today, an enterprise's survival in local or global markets at least partially depends on the knowledge and competencies of its employees, which may easily be considered a competitive factor for the enterprises (or other organizations). Shorter product life cycles and the speed with which the enterprise can react to changing market requirements are often important factors in competition and ones that underline the importance of being able to convey information on products and services to employees as swiftly as possible. Moreover, enterprise globalization and the resulting international competitive pressure are making rapid global knowledge transfer even more significant. Thus, enterprises are often faced with the challenge of lifelong learning to train a (perhaps globally) distributed workforce, update partners and suppliers about new products and developments, educate apprentices or new hires, or set up new markets. In other words, efficient and targeted learning is a challenge that learners, employees, and employers are equally faced with. But traditional classroom training typically ties up time and resources, takes employees away from their day-to-day tasks, and drives up expenses. Electronic learning systems provide users with the ability to access course content directly from their computers, without the need for intermediaries such as teachers, tutors, and the like.

SUMMARY

This disclosure generally describes a method for changing learning strategies. A training course may be presented to a learner in order based on a learning strategy. A disparate learning strategy is received from the learner specific to the training course. The disparate learning strategy is applied to the training course. The training course is presented to the learner in order based on the disparate learning strategy.

In accordance with a particular embodiment, a reset request may be received from the learner in connection with the disparate learning strategy and the training course reset. The disparate learning strategy may be a valid learning strategy for the training course. Also, the learning strategy comprises at least one of a macro-strategy and a micro-strategy for the training course. The macro-strategies comprise at least one of table of contents, deductive, inductive, goal-based (top-down), goal-based (bottom-up), table of contents, SCORM, and linear. The micro-strategies comprise at least one of orientation only, initial orientation, action oriented, orientation oriented, explanation oriented, task oriented, example oriented, table of contents, and SCORM.

The details of one or more embodiments are set forth in the accompanying drawings and the description below. Features, aspects, and advantages will be apparent from the description, drawings, and claims.

DESCRIPTION OF DRAWINGS

FIG. 5 illustrates an example graph for a course;

FIG. 6 illustrates an example graph for a sub-course;

FIGS. 9A-C illustrate example dialog screens for constraining learning strategies according to one embodiment of the present disclosure;

DETAILED DESCRIPTION

Figure 1:
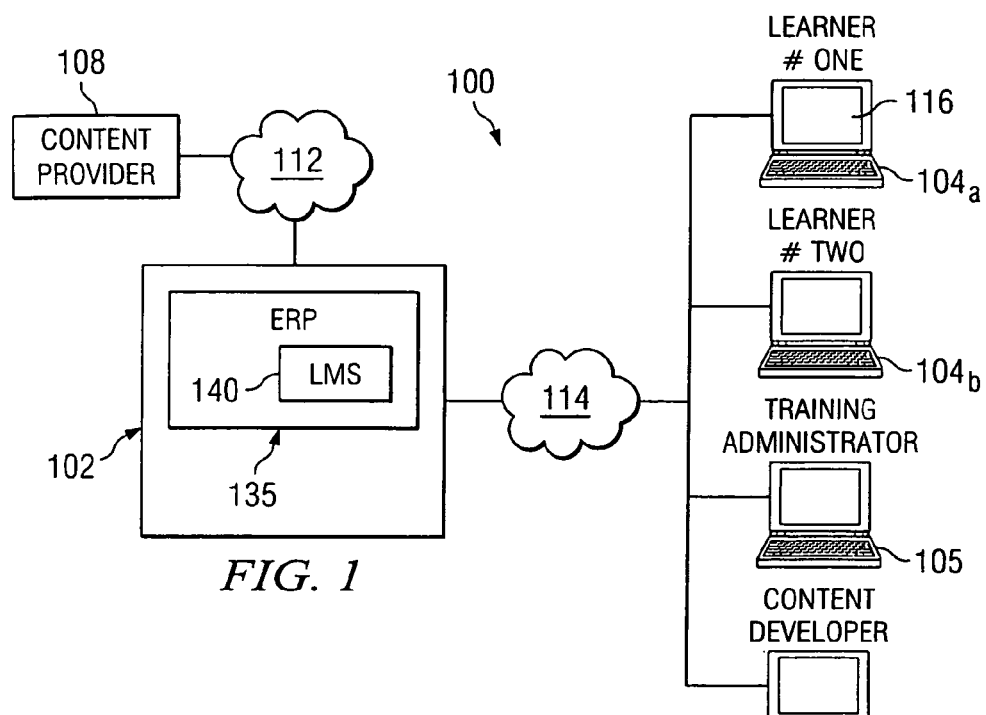
FIG. 1 illustrates an example learning environment according to one embodiment of the present disclosure.

FIG. 1 illustrates an example environment for a learning management system 140 that may deliver a blended learning solution of learning methods used in traditional classroom training, web-based training, and virtual classrooms. At a high level, the learning management system 140 provides convenient information on the learner 104's virtual workplace and may at least partially control the learning process. The system 140 may propose learning units to a learning 104 based on the learner 104's personal data, track progress through courses and/or coordinate the personalized learning experience. In addition, learning management system 140 may encompass the administrative side of the learning platform, where a training administrator 105 structures and updates the offering and distributes it among the target groups. Moreover, the course offering may or may not be restricted to internally hosted content. The learning management system 140 may offer robust reporting capabilities, including ad hoc reporting and business intelligence. These capabilities may provide in-depth analysis of the entire business or organization, thereby enabling better decision making. Moreover, while implementing certain versioning techniques, learning management system 140 may significantly improve the time and storage required for creating versions of particular learning objects, while maintaining the basic structure of the original format helping to ensure compatibility with other systems. More specifically, support for accessing delta versioned files may be transparent to the learner 104 via the existing client, such that applications reading the content can remain unchanged. Also the lookup for a referenced file is fast and therefore the read performance is not affected in any significant way.

Learning management system 140 also may help improve the quality of training and cut costs by reducing the travel and administrative costs associated with classroom training while delivering a consistent learning offering. Training administrators 105 may customize teaching scenarios by using web services to integrate external content, functions, and services into the learning platform from a remote or third party content provider 108. The training administrator 105 can administer internal and external participants (or learners 104) and enroll them for courses to be delivered via any suitable technique. Training management supports the respective organization, entity, or learner 104 in the day-to-day activities associated with course bookings. Booking activities can be performed by the training administrator 105 in training management on an individual or group participant basis. For example, training administrator 105 can request, execute, or otherwise manage one or more of the following activities in a dynamic participation menu presented in learning management system 140: i) prebook: if participants are interested in taking certain classroom courses or virtual classroom sessions, but there are no suitable dates scheduled, learners 104 can be prebooked for the course types. Prebooking data can be used to support a demand planning process; ii) book: individual or group learners 104 (for example, companies, departments, roles, or other organizational units) can be enrolled for courses that can be delivered using many technologies; iii) rebook: learners 104 can book a course on an earlier or later date than originally booked; iv) replace: learners 104 can be swapped; and v) cancel: course bookings can be canceled, for example, if the learners 104 cannot attend.

Environment 100 is typically a distributed client/server system that spans one or more networks such as external network 112 or internal network 114. In such embodiments, data may be communicated or stored in an encrypted format such as, for example, using the RSA, WEP, or DES encryption algorithms. In other implementations, environment 100 may be in a dedicated enterprise environment—across a local area network or subnet—or any other suitable environment without departing from the scope of this disclosure. Indeed, while generally described or referenced in terms of an enterprise, the components and techniques may be implemented in any suitable environment, organization, entity, and such.

Referring to FIG. 1, environment 100 may include or be communicably coupled with server 102, one or more learners 104 or other users on clients, and network 112. In this embodiment, environment 100 is also communicably coupled with external content provider 108. Server 102 comprises an electronic computing device operable to receive, transmit, process and store data associated with environment 100. Generally, FIG. 1 provides merely one example of computers that may be used with the disclosure. Each computer is generally intended to encompass any suitable processing device. For example, although FIG. 1 illustrates one server 102 that may be used with the disclosure, environment 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server. Server 102 may also be communicably coupled with a remote repository over a portion of network 112. While not illustrated, the repository may be any intra-enterprise, inter-enterprise, regional, nationwide, or other electronic storage facility, data processing center, or archive that allows for one or a plurality of clients (as well as servers 102) to dynamically store data elements, which may include any business, enterprise, application or other transaction data.

For example, the repository may be a central database communicably coupled with one or more servers 102 and clients via a virtual private network (VPN), SSH (Secure Shell) tunnel, or other secure network connection. This repository may be physically or logically located at any appropriate location including in one of the example enterprises or offshore, so long as it remains operable to store information associated with environment 1100 and communicate such data to at least a subset of plurality of the clients (perhaps via server 102).

As a possible supplement to or as a portion of this repository, server 102 may include local memory. The memory may include any memory or database module and may take the form of volatile or non-volatile memory including, without limitation, magnetic media, optical media, random access memory (RAM), read-only memory (ROM), removable media, or any other suitable local or remote memory component. For example, the memory may store or reference a large volume of information relevant to the planning, management, and/or follow-up of courses or other content. This example data may include information on i) course details, such as catalog information, dates, prices, capacity, time schedules, assignment of course content, and completion times; ii) personnel resources, such as trainers who are qualified to hold courses; iii) room details, such as addresses, capacity, and equipment; and iv) participant data for internal and external participants. The memory may also include any other appropriate data such as VPN applications or services, firewall policies, a security or access log, print or other reporting files, HTML files or templates, data classes or object interfaces, child software applications or sub-systems, and others. In some embodiments, the memory may store information as one or more tables in a relational database described in terms of SQL statements or scripts. In another embodiment, the memory may store information as various data structures in text files, eXtensible Markup Language (XML) documents, Virtual Storage Access Method (VSAM) files, flat files, Btrieve files, comma-separated-value (CSV) files, internal variables, or one or more libraries. But any stored information may comprise one table or file or a plurality of tables or files stored on one computer or across a plurality of computers in any appropriate format. Indeed, some or all of the learning or content data may be local or remote without departing from the scope of this disclosure and store any type of appropriate data.

Server 102 also includes one or more processors. Each processor executes instructions and manipulates data to perform the operations of server 102 such as, for example, a central processing unit (CPU), a blade, an application specific integrated circuit (ASIC), or a field-programmable gate array (FPGA). Although this disclosure typically discusses computers in terms of a single processor, multiple processors may be used according to particular needs and reference to one processor is meant to include multiple processors where applicable. In the illustrated embodiment, the processor executes enterprise resource planning (ERP) solution 135, which may provide organizations with strategic insight, ability to differentiate, increased productivity, and flexibility needed to succeed. With software such as ERP solution 135, the implementing entity may automate end-to-end processes and extend those processes beyond the particular organization to the entire system by incorporating customers, partners, suppliers, or other entities. For example, ERP solution 135 may include or implement easy-to-use self-services and role-based access to information and services for certain users, thereby possibly boosting productivity and efficiency. In another example, ERP solution 135 may include or implement analytics that enable the particular entity or user to evaluate performance and analyze operations, workforce, and financials on an entity and individual level for strategic and operational insight. ERP solution 135 may further include or implement i) financials to control corporate finance functions while providing support for compliance to rigorous regulatory mandates; ii) operations to support end-to-end logistics for complete business cycles and capabilities that improve product quality, costs, and time to market; and/or iii) corporate services to optimize both centralized and decentralized services for managing real estate, project portfolios, business travel, environment, health and safety, and quality. In the illustrated embodiment, ERP solution 135 also includes or implements some form of human capital management (in this case, learning) to maximize or increase the profitability or other measurable potential of the users, with support for talent management, workforce deployment, and workforce process management. In certain cases, ERP solution 135 may be a composite application that includes, execute, or otherwise implement some or all of the foregoing aspects, which include learning management system 140 as illustrated.

As briefly described above, learning management system 140 is any software operable to provide a comprehensive or other suitable enterprise learning platform capable of managing and integrating business and learning processes and supporting, in one embodiment, all methods of learning, not restricted to e-learning or classroom training. As described in more detail in FIG. 2, learning management system 140 may be fully integrated with ERP solution 135 and include an intuitive learning portal and a powerful training and learning management system, as well as content authoring, structuring, and management capabilities. Learning management system 140 may offer back-office functionality for competency management and comprehensive assessment for performance management, and offers strong analytical capabilities, including support for ad hoc reporting. The solution may use a comprehensive learning approach to deliver knowledge to all stakeholders, and tailors learning paths to an individual's educational needs and personal learning style. Interactive learning units can be created with a training simulation tool that is also available.

Regardless of the particular implementation, "software" may include software, firmware, wired or programmed hardware, or any combination thereof as appropriate. Indeed, ERP solution 135 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while ERP solution 135 is illustrated in FIG. 1 as including one sub-module learning management system 140, ERP solution 135 may include numerous other sub-modules or may instead be a single multi-tasked module that implements the various features and functionality through various objects, methods, or other processes. Further, while illustrated as internal to server 102, one or more processes associated with ERP solution 135 may be stored, referenced, or executed remotely. For example, a portion of ERP solution 135 may be a web service that is remotely called, while another portion of ERP solution 135 may be an interface object bundled for processing at the remote client. Moreover, ERP solution 135 and/or learning management system 140 may be a child or sub-module of another software module or enterprise application (not illustrated) without departing from the scope of this disclosure.

Server 102 may also include an interface for communicating with other computer systems, such as the clients, over networks, such as 112 or 114, in a client-server or other distributed environment. In certain embodiments, server 102 receives data from internal or external senders through the interface for storage in the memory and/or processing by the processor. Generally, the interface comprises logic encoded in software and/or hardware in a suitable combination and operable to communicate with networks 112 or 114. More specifically, the interface may comprise software supporting one or more communications protocols associated with communications network 112 or hardware operable to communicate physical signals.

Network 112 facilitates wireless or wireline communication between computer server 102 and any other local or remote computers, such as clients. Network 112, as well as network 114, facilitates wireless or wireline communication between computer server 102 and any other local or remote computer, such as local or remote clients or a remote content provider 108. While the following is a description of network 112, the description may also apply to network 114, where appropriate. For example, while illustrated as separate networks, network 112 and network 114 may be a continuous network logically divided into various sub-nets or virtual networks without departing from the scope of this disclosure. In some embodiments, network 112 includes access points that are responsible for brokering exchange of information between the clients. As discussed above, access points may comprise conventional access points, wireless security gateways, bridges, wireless switches, sensors, or any other suitable device operable to receive and/or transmit wireless signals. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. Turning to network 114, as illustrated, it may be all or a portion of an enterprise or secured network. In another example, network 114 may be a VPN between server 102 and a particular client across wireline or wireless links. In certain embodiments, network 114 may be a secure network associated with the enterprise and certain local or remote clients.

Each client is any computing device operable to connect or communicate with server 102 or other portions of the network 114 using any communication link. At a high level, each client includes or executes at least GUI 116 and comprises an electronic computing device operable to receive, transmit, process and store any appropriate data associated with environment 100. It will be understood that there may be any number of clients communicably coupled to server 102. Further, "client" and "learner," "administrator," "developer" and "user" may be used interchangeably as appropriate without departing from the scope of this disclosure. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device or computer. For example, the client may be a PDA operable to wirelessly connect with external or unsecured network. In another example, the client may comprise a laptop that includes an input device, such as a keypad, touch screen, mouse, or other device that can accept information, and an output device that conveys information associated with the operation of server 102 or other clients, including digital data, visual information, or GUI 116. Both the input device and output device may include fixed or removable storage media such as a magnetic computer disk, CD-ROM, or other suitable media to both receive input from and provide output to users of the clients through the display, namely the client portion of GUI or application interface 116.

GUI 116 comprises a graphical user interface operable to allow the user of the client to interface with at least a portion of environment 100 for any suitable purpose, such as viewing application or other transaction data. Generally, GUI 116 provides the particular user with an efficient and user-friendly presentation of data provided by or communicated within environment 100. As shown in later FIGs, GUI 116 may comprise a plurality of customizable frames or views having interactive fields, pull-down lists, and buttons operated by the user. GUI 116 may be a learning interface allowing the user or learner 104 to search a course catalog, book and cancel course participation, and support individual course planning (e.g., by determining qualification deficits and displaying a learner's completed, started, and planned training activities). Learner 104 also may access and work through web based courses using the learning interface. The learning interface may be used to start a course, reenter a course, exit a course, and take tests. The learning interface also provides messages, notes, and special course offerings to the learner 104. GUI 116 may also be a course editor allowing the content developer to create the structure for the course content, which may be associated with certain metadata. The metadata may be interpreted by a content player of learning management system 140 (described below) to present a course to learner 104 according to a learning strategy selected at run time. In particular, the course editor may enable the author or content developer 106 to classify and describe structural elements, assign attributes to structural elements, assign relations between structural elements, and build a subject-taxonomic course structure. The course editor generates the structure of the course and may include a menu bar, a button bar, a course overview, a dialog box, and work space. The menu bar may include various drop-down menus, such as, for example, file, edit, tools, options, and help. The drop-down menus may include functions, such as create a new course, open an existing course, edit a course, or save a course. The button bar may include a number of buttons. The buttons may be shortcuts to functions in the drop down menus that are used frequently and that activate tools and functions for use with the course editor. The remaining portions of the example course editor interface may be divided in to three primary sections or windows: a course overview, a dialog box, and a workspace. Each of the sections may be provided with horizontal or vertical scroll bars or other means allowing the windows to be sized to fit on different displays while providing access to elements that may not appear in the window.

GUI 116 may also present a plurality of portals or dashboards. For example, GUI 116 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by presentation elements 140. GUI 116 is often configurable, supporting a combination of tables and graphs (bar, line, pie, status dials, etc.), and is able to build real-time dashboards, where presentation elements 140 (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 116 may indicate a reference to the front-end or other component of learning management system 140, as well as the particular interface or learning portal accessible via the client, as appropriate, without departing from the scope of this disclosure. In short, GUI 116 contemplates any graphical user interface, such as a generic web browser or touch screen, that processes information in environment 100 and efficiently presents the results to the user. Server 102 can accept data from the client via the web browser (e.g., Microsoft Internet Explorer or Netscape Navigator) and return the appropriate HTML or XML responses to the browser using network 112 or 114, such as those illustrated in subsequent FIGs.

Figure 2:
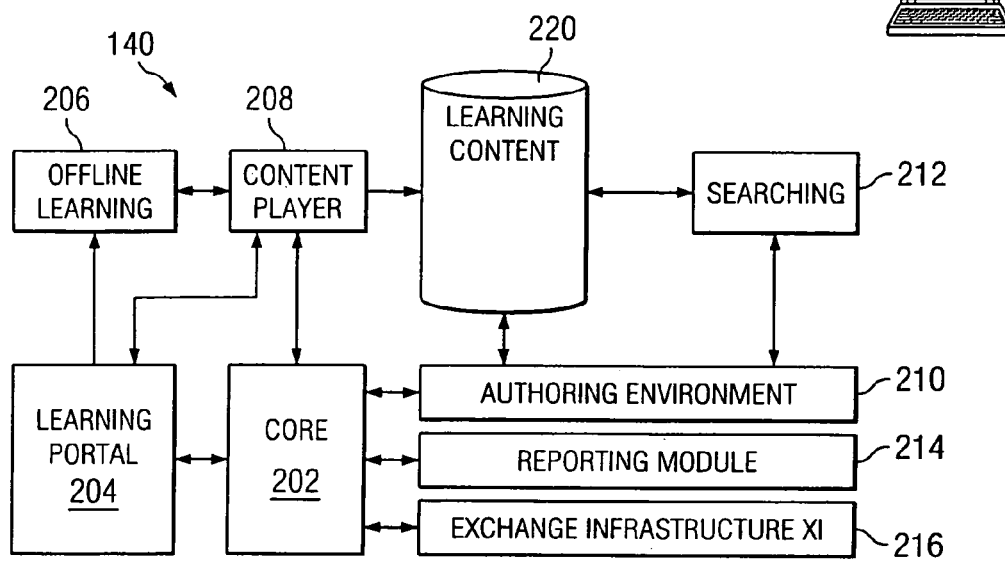
FIG. 2 illustrates an example learning management system implemented within the learning environment of FIG. 1 according to one embodiment of the present disclosure.

FIG. 2 illustrates one example implementation of learning management system (LMS) 140. In the illustrated embodiment, LMS 140 comprises four example components, namely i) a management system core 202, which controls learning processes and manages and handles the administrative side of training; ii) a learning portal 204, which is the learner's springboard into the learning environment, which allows the learner to access the course offering and information on personal learning data and learning activities; iii) an authoring environment 210, where learning content and tests are designed and structured; and iv) a content management system 220, where learning content is stored and managed. The LMS 140 may comprise only some of the described components and/or additional components. Generally, LMS 140 is aimed at learners 104, trainers 105, course authors 106 and instructional designers, administrators, and managers.

Learners 104 log on to their personalized learning portal 204 from any suitable client via GUI 116. The learning portal 204 is the user's personalized point of access to the learning-related functions. Generally, learning portal 204 presents details of the complete education and training offering, such as traditional classroom training, e-learning courses (such as virtual classroom sessions or web-based training), or extensive curricula. Self-service applications enable learners 104 to enroll themselves for courses, prebook for classroom courses, and cancel bookings for delivery methods, as well as start self-paced learning units directly. If learner 104 wants to continue learning offline, the learner can download the courses onto the client and synchronize the learning progress later. The learning portal 204 may be seamlessly integrated in an enterprise portal, where learner 104 is provided with access to a wide range of functions via one system. Such an enterprise portal may be the learner's single point of entry and may integrate a large number of role-based functions, which are presented to the user in a clear, intuitive structure. The learning portal 204 may give learner 104 access to functions such as, for example, search for courses using i) find functions: finding courses in the course catalog that have keywords in the course title or description; and ii) extended search functions: using the attributes appended to courses, such as target group, prerequisites, qualifications imparted, or delivery method. Additional functions may include self-service applications for booking courses and canceling bookings, messages and notes, course appraisals, and special (or personalized) course offering including courses prescribed for the learner 104 on the basis of his or her role in the enterprise or the wishes of the respective supervisor or trainer and qualification deficits of learner 104 that can be reduced or eliminated by participating in the relevant courses. The learning portal 204 may also provide a view of current and planned training activities, as well as access to courses booked, including: i) starting a course; ii) reentering an interrupted course; iii) downloading a course and continuing learning offline; iv) going online again with a downloaded course and synchronizing the learning progress; v) exiting a course; and vi) taking a test.

On the basis of the information the learning management system 140 has about learner 104, the learning management system core 202 may propose learning units for the learner 104, monitors the learner's progress, and coordinates the learner's personal learning process. In addition, the learning management system core 202 may be responsible for managing and handling the administrative processes. Targeted knowledge transfer may use precise matching of the learning objectives and qualifications of a learning unit with the learner's level of knowledge. For example, at the start of a course, the management system core 202 may compare learning objectives already attained by the respective learner 104 with the learning objectives of the course. On the basis of this, core 202 determines the learner's current level and the required content and scope of the course. The resulting course is then presented to the learner 104 via a content player 208.

The content player 208 is a virtual teacher that tailors learning content to the needs of the individual learner 104 and helps the learner navigate through the course. In this embodiment, the content player 208 may present the learning course to the learner 104. In certain embodiments, the content player 208 is a Java application that is deployed on a Java runtime environment, such as J2EE. In this case, it is linked with other systems such as a web application server and ERP solution 135 via the Java Connector. The individual course navigation may be set up at runtime on the basis of the learning strategy stored in the learner account. In particular, the content player 208 may when starting a learning course read from the ERP 135 or other backend system which strategies are allowed for the course and/or selected for the course. Selected and/or changed strategies for a course are stored in the backend system. Using the didactical strategies, content player 208 may dynamically adapt the course to the individual learning situation and the preferences expressed by learner 104. The content player 208 may calculate dynamically adjusted learning paths and presents these to the learner 104—graphically or otherwise—to facilitate orientation within a complex subject area. The learner 104 can resume working on an interrupted course at any time. At this point, the content player 208 guides the learner 104 to the spot at which training was interrupted.

Offline learning player 206 generally enables learners 104 to download network or other web-based courses from the learning portal 204 and play them locally. Locally stored courses are listed in the course list with an icon indicating the status of each course. The offline player 206 may guide the learner 104 through the course according to the preferred learning strategy. It may also dynamically adjust the number and sequence of learning objects to the learner's individual learning pattern. If the learner 104 interrupts a course, the offline player 206 reenters the course at the point of interruption the next time. The learner 104 can, at any point in time, resynchronize his offline learning progress with the learning portal 204 and either continue learning online or set the course to a completed status.

LMS core 202 may also include or invoke training management that would be an administrative side of LMS 140. This may include course planning and execution, booking and cancellation of course participation, and follow-up processing, including cost settlement. In training management, the training administrator 105 creates the course offering and can, for example, define training measures for individual learners 104 and groups of learners 104. The training administrator 105 creates the course catalog in training management and makes it available (partially or completely) to learners 104 in the learning portal 204 for reference and enrollment purposes. The training administrator 105 can typically administer internal and external participants and enroll them for courses to be delivered using various technologies and techniques. Training management supports numerous business processes involved in the organization, management, and handling of training. Training management can be configured to meet the requirements, work processes, and delivery methods common in the enterprise. Training measures are usually flexibly structured and may include briefings, seminars, workshops, virtual classroom sessions, web-based trainings, external web-based trainings, static web courses, or curricula. Training management includes functions to efficiently create the course offerings. Using course groups to categorize topics by subject area enables flexible structuring of the course catalog. For example, when training administrator 105 creates a new subject area represented by a course group, he can decide whether it should be accessible to learners 104 in the learning portal 202.

Reporting functions 214 in training management enable managers to keep track of learners' learning activities and the associated costs at all times. Supervisors or managers can monitor and steer the learning processes of their employees. They can be notified when their employees request participation or cancellation in courses and can approve or reject these requests. LMS 140 may provide the training manager with extensive support for the planning, organization, and controlling of corporate education and training. Trainers need to have up-to-the-minute, reliable information about their course schedules. There is a wide range of reporting options available in training management to enable the trainer to keep track of participants, rooms, course locations, and so on.

Authoring environment 210 may contain tools and wizards that content developers 106 and instructional designers can use to create or import external course content. External authoring tools can be launched directly via authoring environment 210 to create learning content that can be integrated into learning objects and combined to create complete courses (learning nets). Attributes may be appended to content, thereby allowing learners 104 to structure learning content more flexibly depending on the learning strategy they prefer. Customizable and flexible views allow subject matter experts and instructional designers to configure and personalize the authoring environment 210. To create the HTML pages for the content, the user can, in one embodiment, easily and seamlessly integrate editors from external providers or other content providers 108 into LMS 140 and launch the editors directly from authoring environment 210. Authoring environment 210 may include a number of tools for creating, structuring, and publishing course content and tests to facilitate and optimize the work of instructional designers, subject matter experts, and training administrators 105. Authoring environment 210 may contain any number of components or sub-modules such as an instructional design editor is used by instructional designers and subject matter experts to create and structure learning content (learning nets and learning objects), a test author is used by instructional designers and subject matter experts to create web-based tests, and a repository explorer is for training administrators and instructional designers to manage content.

In the illustrated embodiment, course content is stored and managed in content management system 220. Put another way, LMS 140 typically uses the content management system 220 as its content storage location. In another embodiment, a WebDAV (Web-based Distributed Authoring and Versioning) interface (or other HTTP extension) may allow integration of other WebDAV-enabled storage facilities as well without departing from the scope of this disclosure. Content authors or developers 106 publish content in the back-end training management system. Links to this content may assist the training administrator 105 in retrieving suitable course content when planning web-based courses. A training management component of LMS 140 may help the training administrator 105 plan and create the course offering; manage participation, resources, and courses; and perform reporting. When planning e-learning courses, the training administrator 105 may use references inserted in published courses to retrieve the appropriate content in the content management system for the courses being planned. Content management system 220 may also include or implement content conversion, import, and export functions, allowing easy integration of Sharable Content Object Reference Model (SCORM)-compliant courses from external providers or other content providers 108. Customers can create and save their own templates for the various learning elements (learning objects, tests, and so on) that define structural and content-related specifications. These provide authors with valuable methodological and didactical support.

LMS 140 and its implemented methodology typically structure content so that the content is reusable and flexible. For example, the content structure allows the creator of a course to reuse existing content to create new or additional courses. In addition, the content structure provides flexible content delivery that may be adapted to the learning styles of different learners. E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 3, course material 300 may be divided into four structural elements: a course 301, a sub-course 302, a learning unit 303, and a knowledge item 304. Course material 300 may include only some of the described elements and/or other or additional elements. Accordingly, course 301 may comprise contact structured, divided and/or related in any suitable way.

Figure 3:
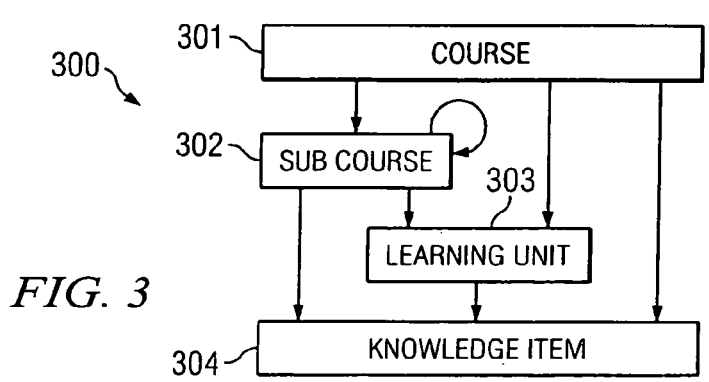
FIG. 3 illustrates an example content aggregation model in the learning management system of FIG. 2 according to one embodiment of the present disclosure.

Referring to FIG. 3, starting from the lowest level, knowledge items 304 are the basis for the other structural elements and are the building blocks of the course content structure. Each knowledge item 304 may include content that illustrates, explains, practices, or tests an aspect of a thematic area or topic. Knowledge items 304 typically are small in size (i.e., of short duration, e.g., approximately five minutes or less). Any number of attributes may be used to describe a particular knowledge item 304 such as, for example, a name, a type of media, and a type of knowledge. The name may be used by a learning system to identify and locate the content associated with a knowledge item 304. The type of media describes the form of the content that is associated with the knowledge item 304. For example, media types may include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

Knowledge item 304 also may be described by the attribute of knowledge type. For example, knowledge types may include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Knowledge types are described in further detail below.

Knowledge items 304 may be generated using a wide range of technologies, often allowing a browser (including plug-in applications) to be able to interpret and display the appropriate file formats associated with each knowledge item. For example, markup languages (such as HTML, a standard generalized markup language (SGML), a dynamic HTML (DHTML), or XML), JavaScript (a client-side scripting language), and/or Flash may be used to create knowledge items 304. HTML may be used to describe the logical elements and presentation of a document, such as, for example, text, headings, paragraphs, lists, tables, or image references. Flash may be used as a file format for Flash movies and as a plug-in for playing Flash files in a browser. For example, Flash movies using vector and bitmap graphics, animations, transparencies, transitions, MP3 audio files, input forms, and interactions may be used. In addition, Flash allows a pixel-precise positioning of graphical elements to generate impressive and interactive applications for presentation of course material to a learner.

Learning units 303 may be assembled using one or more knowledge items 304 to represent, for example, a distinct, thematically-coherent unit. Consequently, learning units 303 may be considered containers for knowledge items 304 of the same topic. Learning units 303 also may be considered relatively small in size (i.e., duration) though larger than a knowledge item 304.

Sub-courses 302 may be assembled using other sub-courses 302, learning units 303, and/or knowledge items 304. The sub-course 302 may be used to split up an extensive course into several smaller subordinate courses. Sub-courses 302 may be used to build an arbitrarily deep nested structure by referring to other sub-courses 302.

Courses 301 may be assembled from all of the subordinate structural elements including sub-courses 302, learning units 303, and knowledge items 304. To foster maximum reuse, all structural elements may be self-contained and context free.

Structural elements also may be tagged with metadata that is used to support adaptive delivery, reusability, and search/retrieval of content associated with the structural elements. For example, learning object metadata (LOM), per maps defined by the IEEE "Learning Object Metadata Working Group," may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 4:
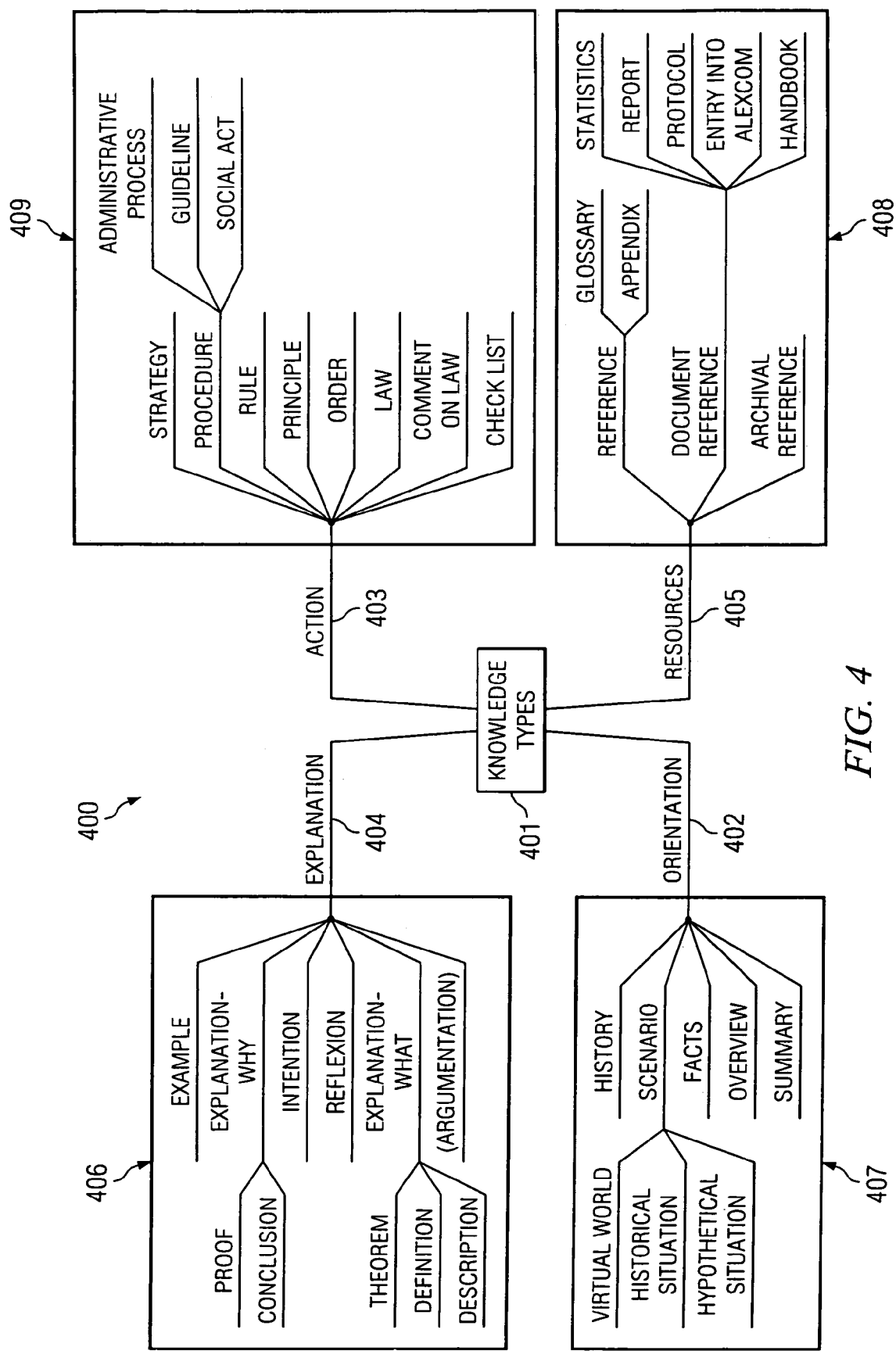
FIG. 4 illustrates an example ontology of knowledge types used in the learning management system of FIG. 2 according to one embodiment of the present disclosure.

As shown in FIG. 4, structural elements may be categorized using a didactical ontology 400 of knowledge types 401 that includes orientation knowledge 402, action knowledge 403, explanation knowledge 404, and resource knowledge 405. Structural elements may be otherwise suitably categorized. In addition, only some of the described knowledge types and/or additional knowledge types may be used.

Orientation knowledge 402 helps a learner 104 to find their way through a topic without being able to act in a topic-specific manner and may be referred to as "know what." Action knowledge 403 helps a learner to acquire topic related skills and may be referred to as "know how." Explanation knowledge 404 provides a learner with an explanation of why something is the way it is and may be referred to as "know why." Resource knowledge 405 teaches a learner where to find additional information on a specific topic and may be referred to as "know where."

The four knowledge types (orientation, action, explanation, and reference) may be further divided into a fine grained ontology. For example, orientation knowledge 402 may refer to sub-types 407 that include a history, a scenario, a fact, an overview, and a summary. Action knowledge 403 may refer to sub-types 409 that include a strategy, a procedure, a rule, a principle, an order, a law, a comment on law, and a checklist. Explanation knowledge 404 may refer to sub-types 406 that include an example, an intention, a reflection, an explanation of why or what, and an argumentation. Resource knowledge 405 may refer to sub-types 408 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B" describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 304 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 302 or a learning unit 303. The competencies may be used to indicate and evaluate the performance of a learner as learner 104 traverses the course material. A competency may be classified as a cognitive skill, an emotional skill, a senso-motorical skill, or a social skill.

The content structure associated with a course 301 may be represented as a set of graphs. A structural element may be represented as a node in a graph. Node attributes may be used to convey the metadata attached to the corresponding structural element (e.g., a name, a knowledge type, a competency, and/or a media type). A relation between two structural elements may be represented as an edge. For example, FIG. 5 shows a graph 500 for a course 301. The course 301 is divided into four structural elements or nodes (510, 520, 530, and 540): three sub-courses 302 (e.g., knowledge structure, learning environment, and tools) and one learning unit 303 (e.g., basic concepts). A node attribute 550 of each node is shown in brackets (e.g., the node labeled "Basic concepts" has an attribute that identifies it as a reference to a learning unit). In addition, an edge 580 expressing the relation "context of" has been specified for the learning unit 303 with respect to each of the sub-courses 302. As a result, the basic concepts explained in the learning unit 303 provide the context for the concepts covered in the three sub-courses 302.

FIG. 6 shows a graph 600 of the sub-course "Knowledge structure" of FIG. 5. In this example, the sub-course "Knowledge structure" is further divided into three nodes (610, 620, and 630): a learning unit (e.g., on relations) and two sub-courses (e.g., covering the topics of methods and knowledge objects). The edge 640 expressing the relation "determines" has been provided between the structural elements (e.g., the sub-course "Methods" determines the sub-course "Knowledge objects" and the learning unit "Relations".) In addition, the attributes 650 of each node is shown in brackets (e.g., nodes "Methods" and "Knowledge objects" have the attribute identifying them as references to other sub-courses; node "Relations" has the attribute of being a reference to a learning unit).

Figure 7:
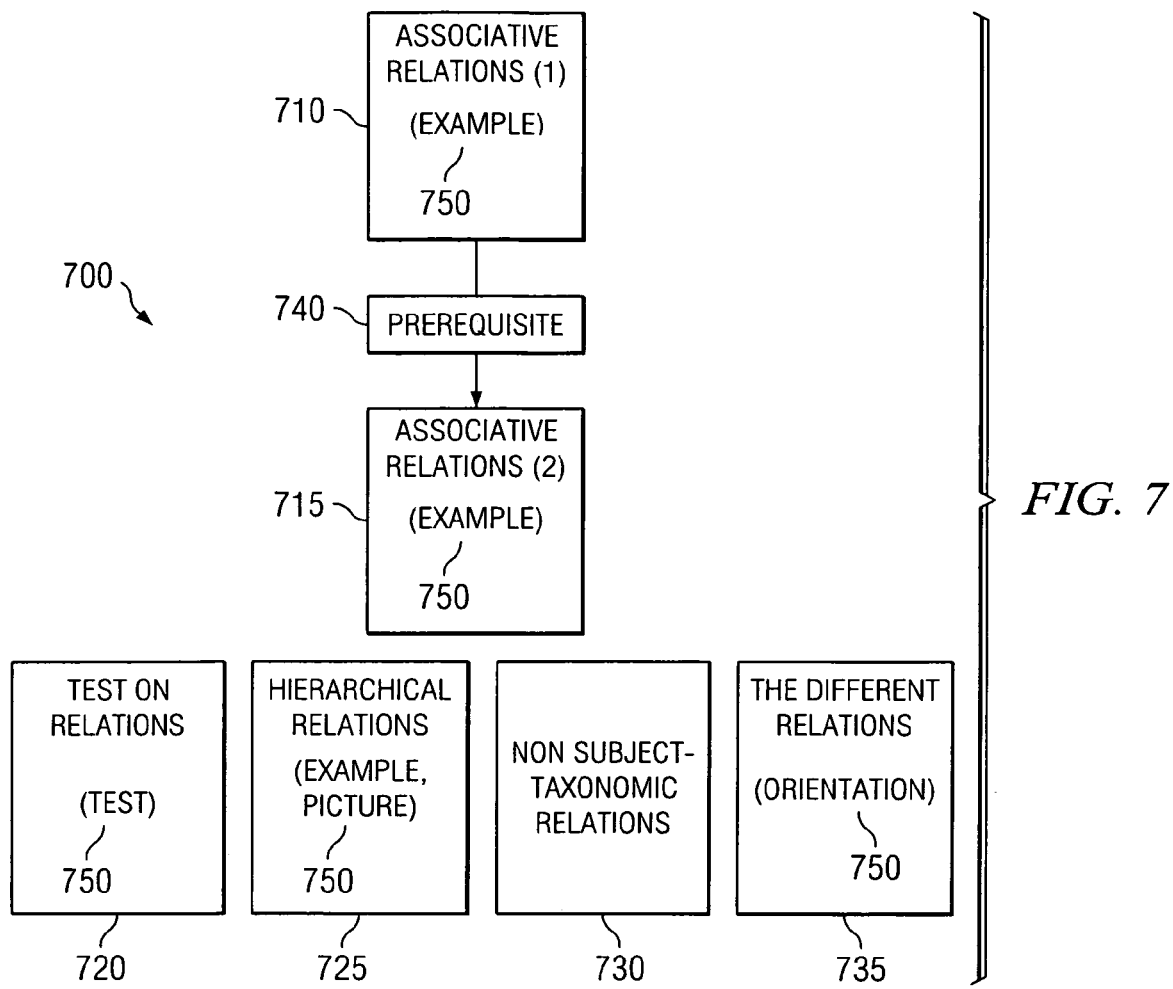
FIG. 7 illustrates an example graph for a learning unit.

FIG. 7 shows a graph 700 for the learning unit "Relations" shown in FIG. 6. The learning unit includes six nodes (710, 715, 720, 725, 730, and 735): six knowledge items (i.e., "Associative relations (1)", "Associative relations (2)", "Test on relations", "Hierarchical relations", "Non subject-taxonomic relations", and "The different relations"). An edge 740 expressing the relation "prerequisite" has been provided between the knowledge items "Associative relations (1)" and "Associative relations (2)." In addition, attributes 750 of each node are specified in brackets (e.g., the node "Hierarchical relations" includes the attributes "Example" and "Picture").

The above-described content aggregation and structure associated with a course 301 does not, in one embodiment, automatically enforce any sequence that a learner may use to traverse the content associated with the course 301. As a result, different sequencing rules may be applied to the same course structure to provide different paths through the course 301. The sequencing rules applied to the knowledge structure of a course are the learning strategies. The learning strategies may be used to pick specific structural elements to be suggested to the learner as the learner progresses through the course 301. The learner or supervisor (e.g., a tutor) may select from a number of different learning strategies while taking a course. In turn, the selected learning strategy considers both the requirements of the course structure and the preferences of the learner.

As described in more detail below, a learner may choose between one or more learning strategies to determine which path to take through the course 301. As a result, the progression of learners through the course 301 may differ. Learning strategies may be created using macro-strategies and micro-strategies. A learner may select from a number of different learning strategies when taking a course 301. The learning strategies may be selected at run time of the presentation of course content to the learner (and, in this embodiment, not during the design of the knowledge structure of the course). As result, course authors may be relieved from the burden of determining a sequence or an order of presentation of the course material. Instead, course authors may focus on structuring and annotating the course material. In addition, authors may not be required to apply complex rules or Boolean expressions to domain models thus minimizing or reducing the training necessary to use the system. Furthermore, the course material may be easily adapted and reused to edit and create new courses.

Macro-strategies are used in learning strategies to refer to the coarse-grained structure of a course (i.e., the organization of sub-courses 302 and learning units 303). The macro-strategy determines the sequence that sub-courses 302 and learning units 303 of a course 301 are presented to the learner. Basic macro-strategies include "inductive" and "deductive," which allow the learner to work through the course from the general to the specific or the specific to the general, respectively. Other examples of macro-strategies include "goal-based, top-down," "goal-based, bottom-up," "table of contents," SCORM, and "linear."

Goal-based, top-down follows a deductive approach. The structural hierarchies are traversed from top to bottom. Relations within one structural element may be ignored if the relation does not specify a hierarchical dependency. Goal-based bottom-up follows an inductive approach by doing a depth first traversal of the course material. The table of contents simply may ignore all relations. Linear generates a linear display sequence from corresponding non-linear strategies (i.e., SCORM linear). Accordingly, no alternatives are offered in the path.

Micro-strategies, implemented by the learning strategies, target the learning progression within a learning unit. The micro-strategies determine the order that knowledge items of a learning unit are presented. Micro-strategies refer to the attributes describing the knowledge items. Examples of micro-strategies include "orientation only", "action oriented", "explanation oriented", "orientation oriented", "table of contents", "initial orientation", "task oriented", "example oriented", and SCORM.

The micro-strategy "orientation only" ignores all knowledge items that are not classified as orientation knowledge. The "orientation only" strategy may be best suited to implement an overview of the course. The micro-strategy "action oriented" first picks knowledge items that are classified as action knowledge. All other knowledge items are sorted in their natural order (i.e., as they appear in the knowledge structure of the learning unit). The micro-strategy "explanation oriented" is similar to action oriented and focuses on explanation knowledge. For example, "explanation oriented" may displays explanatory knowledge to start with and then other knowledge types. The micro-strategy "orientation oriented" is similar to action oriented and focuses on orientation knowledge. The micro-strategy "table of contents" operates like the macro-strategy table of contents (but on a learning unit level). The micro-strategy "initial orientation" displays orientation knowledge to start with and then other knowledge types. The micro-strategy "task-oriented" displays practical instruction/action to start with and then other knowledge types. The micro-strategy "example oriented" displays example knowledge to start with and then other knowledge types. The micro-strategy SCORM is the strategy used with the corresponding SCORM macro strategy.

In one implementation, no dependencies between macro-strategies and micro-strategies exist. Therefore, any combination of macro and micro-strategies may be used when taking a course. In another embodiment, macro-strategies may limit micro-strategies and/or be dependent on micro-strategies or vice versa.

As previously described, the structure of a course 301 may be made up of a number of graphs of the structural elements included in the course. A selected learning strategy may be applied to the graphs to determine a navigation tree. The navigation tree may be used to navigate a path through the course for the learner. In one embodiment, only parts of the navigation tree are displayed to the learner at the learning portal based on the position of the learner within the course 301.

Learning strategies are applied to the static course structure including the structural elements (nodes), metadata (attributes), and relations (edges). This data is created when the course structure is determined (e.g., by a course author). Once the course structure is created, the content player 208 processes the course structure using a learning strategy to present the material to the learner at the learning portal.

To process courses 301, the content player 208 may grant learning strategies access to the course data and the corresponding attributes. The learning strategy is used to prepare a record of predicates, functions, operations, and orders that are used to calculate navigation suggestions.

The content player 208 accesses files (e.g., XML files storing course graphs and associated media content) in the content repository 220 and applies the learning strategies to the files to generate a path through the course 301. By applying the learning strategies the content player 208 may produce a set of course-related graphs (which may simply be an ordered list of nodes) that are used to generate a navigation tree of nodes. The set of nodes may be sorted to generate an order list of nodes that may be used to present a path through the material for a learner. In one embodiment, graphs and strategies may "interact" in the following ways: i) a learning strategy may implement a set of Boolean predicates that can be applied to graph nodes; ii) a learning strategy may be informed by an event that an action has been performed on a graph node; iii) a learning strategy may provide functions that are used to compute new node sets for a given node; iv) a learning strategy may provide an ordering function that turns node sets computed into ordered lists; v) a learning strategy may decide to alter certain strategy-related node attributes.

The learning strategy may or may not keep an internal state. The last point may be used where the learning strategy does not keep any internal state. Instead, any strategy-related information may be stored in graph nodes' attributes allowing learning strategies to be changed "on the fly" during graph traversal.

As described there are sets of nodes that may be used to generate a path through a course. One set of nodes may be "navigation nodes." Navigation nodes may include all nodes that the strategy identifies that may be immediately reached from the current node. In other words, the navigation nodes represent potential direct successors from a current node. Another set of nodes are "start nodes." Start nodes are potential starting points when entering a new graph. The more starting points this set contains, the more choices a learner has when entering the unit. As a consequence, any learning strategy may implement at least two functions that can compute these sets and the ordering function that transforms those sets into ordered lists.

Processing of a course 301 may begins with a start graph. A set of vertices may include knowledge items 304, references to learning units 303, references to sub courses 302, and a test. Vertices are used when referring to graphs in a mathematical sense (whereas nodes may used to refer to the resulting course structure). A set of edges includes relations types as used in a mathematical sense.

Attributes may be used to define and implement the learning strategies. An edge's logical direction does not necessarily have to agree with the direction indicated by the content player 208, because the content player 208 displays an edge in the "read direction." Undirected edges may be treated as two edges in opposite directions.

Predicates are "dynamic attributes" of vertices. The learning strategy computes the dynamic attributes for an individual vertex. If a vertex is within a learning unit 303, then the micro-strategy is used to compute the predicates. The macro-strategy that is chosen may be responsible for determining all other vertices.

Functions are used to compute the navigation sets (vertices that are displayed). A function may return a set of vertices. The learning strategies implement the functions. For micro-strategies, the chosen macro-strategy calls the functions as needed. When entering a learning unit 303 the macro-strategy may select the appropriate (selected) micro-strategy.

Operations provide information to the chosen learning strategy about particular events that occur during navigation of a course 301. The learning strategy may use them to change the attributes. The operations include a navigation operation that may be called by the runtime environment as soon as the vertex is navigated during the navigation of the course 301 and a test done operation that may be called by the runtime environment if the vertex is a test that has been done. The test done operation may contain the maximum possible score and the score actually attained by the learner. If a vertex is in a learning unit 303, then the micro-strategy may compute these operations. The macro-strategy may be responsible for all other vertices.

The runtime environment may use the sorting function to order the navigation sets that have been computed. The order determines the sequence in which the vertices are to be drawn. The "most important" vertex (e.g., from the learning strategy's point of view) is placed at the start of the list (as the next vertex suggested). The learning strategies implement these sorting functions and the runtime environment provides them. The sorting functions may sort the set of navigation vertices. The sorting functions are, in one embodiment, called automatically as soon as the functions have returned sets of vertices to the strategy in question. It is consequently, in one embodiment, necessary or important that each macro and micro-strategy have a sorting function at its disposal.

Linear macro-strategies represent a special case of the macro-strategies. In linear macro-strategies, the elements of the sorted sets of vertices may be offered for navigation sequentially, rather than simultaneously. This linearization may be applied to any combination of macro and micro-strategies.

Courses 301, as well as course elements, may be otherwise suitably navigated based on one or more learning strategies without departing from the scope of the disclosure. Further information regarding course navigation is disclosed by U.S. patent application Ser. No. 10/158,599, entitled "E-Learning Strategies," filed May 31, 2002, which is hereby incorporated by reference in its entirety for all purposes.

Figure 8:
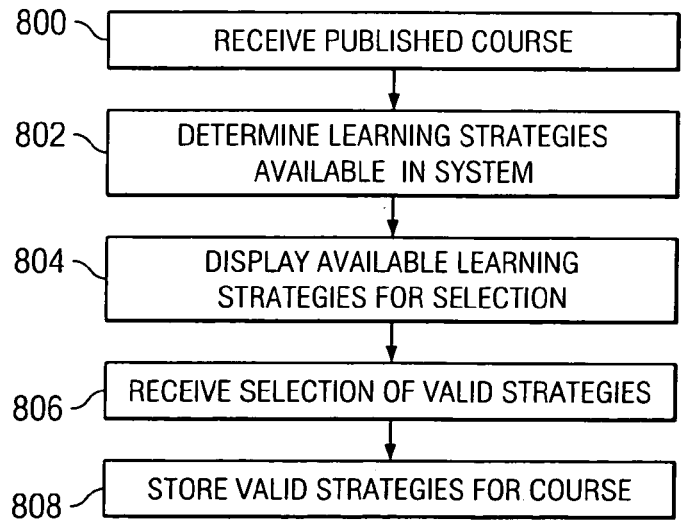
FIG. 8 illustrates an example flow diagram for constraining learning strategies in the learning management system of FIG. 2 according to one embodiment of the present disclosure.

FIG. 8 illustrates a method for constraining learning strategies in a learning system in accordance with one embodiment of the disclosure. Although the following description focuses on the operation of learning management system 140, environment 100 contemplates using any appropriate combination and arrangement of logical elements implementing some or all of the desired functionality. In addition, one or more of the described steps may be performed in a different order, modified, combined or omitted. Also, additional steps may be performed without departing from the scope of the present disclosure.

The method begins at step 800 in which a published course 301 is received. The course 301 may be an electronic training course and comprise one or more sub-courses 302, learning units 303, knowledge items 304 or other content for training. In one embodiment, the author publishes the course 301 by providing the course 301 to or checking-in the course 301 with the training administrator 105 and/or the learning management system 140. The course 301 may be otherwise suitably published by, for example, making the course 301 available to the learning management system 140. Also, learning strategies may be constrained before or after publication, as well as modified at any suitable time.

Proceeding to step 802, the learning management system 140 determines the available learning strategies available in the system. The available learning strategies may, in one embodiment, be globally set by the training administrator 105 of the learning management system 140. As described in more detail below, the learning management system 140 may provide the dialog screen 900 illustrated in FIG. 9A to the training administrator 105 to define learning strategies available in the system 140. The available learning strategies may, for example, be stored in a table including all allowed macro-strategy and micro-strategy combinations for the learning management system 140. In another embodiment, all learning strategies may be available in the learning management system 140.

At step 804, the learning management system 140 displays the available learning strategies to the author. The learning strategies may be displayed as items for selection by the author. As described in more detail below, the learning management system 140 may provide the dialog screen 940 illustrated in FIG. 9B to the author to constrain learning strategies that are valid for the course 301. The author may select specific ones of the available learning strategies as valid or select all available learning strategies as valid for the course 301. For example, at the course level, the author may want the course 301 to only be viewed in one or a few learning strategies so that only a few learning paths are possible. Learning strategies may be valid for the course 301 when the learning strategies work well for the course 301, make sense for the course 301, are not based on features absent from the course 301, are preferred by the author for the course 301, are compatible with the course 301, and/or are not incompatible with the course 301. Thus, the author may not select as valid (or otherwise invalidate) the "example oriented" micro-strategy for the course 301 if the course does not contain any examples, the course contains only a few examples and/or the strategy is not proficient for teaching the course content.

Proceeding to step 806, the learning management system 140 receives a selection of valid strategies from the author. Thus, the valid strategies may be based directly or indirectly on the course content. For example, the author may select one or more specific learning strategies as valid in the dialog screen 940 of FIG. 9B or may select all available learning strategies as valid. The author may be a developer of content for the course 301. Although the selection of valid learning strategies is described as being made by the author, the selection may be made by other persons, for example, the training administrator. In addition, the selection may be made by the system 140 based on input from the author.

At step 808, the learning management system 140 stores the valid strategies for the course 301. As described in more detail below, the learning management system 140 may provide the dialog screen 980 illustrated in FIG. 9C to display the valid strategies per course version. In one embodiment, the valid strategies may be stored in a backend table during the publishing process. However, valid strategies may be otherwise suitably stored in any suitable data storage. The data storage may be any electronic data store system, including one or more integral or distributed devices. In addition, the valid learning strategies may be otherwise obtained from the author or other person, or may, at least in part, be generated by the learning management or other system based on the structural elements of the course 301. For example, the learning management system 140 may invalidate the "example oriented" micro-strategy for the course 301 if the system can not identify any structural elements as examples in the metadata.

Figure 9A:
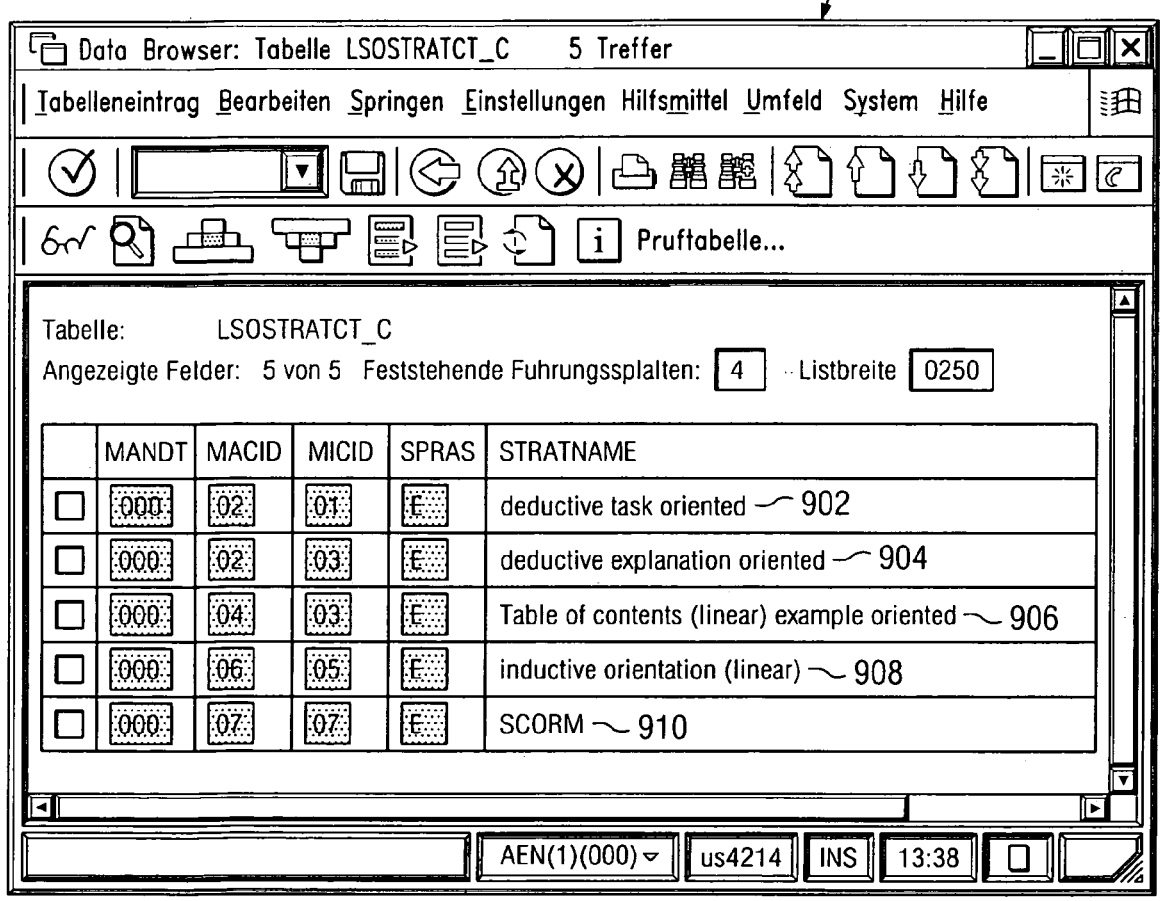
Figure 9B:
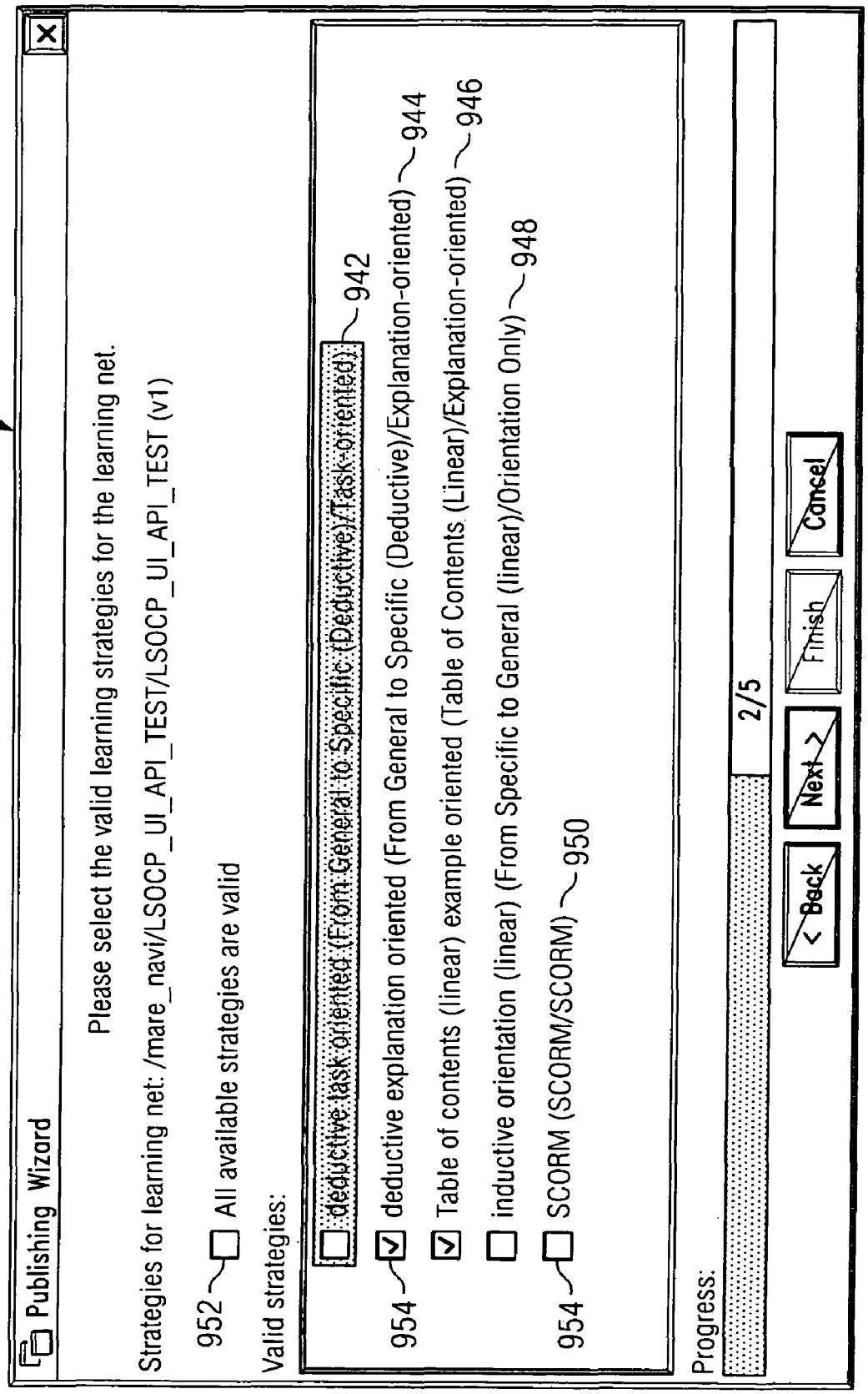

FIGS. 9A-C illustrate example dialog screens for constraining learning strategies. Referring to FIG. 9A, an example dialog screen 900 is illustrated where the training administrator or other authorized person may globally select (limit and/or allow by selection or lack of selection) learning strategies for the learning and management system 140. The strategies may be macro-strategies and/or micro-strategies. In the illustrated example, allowed strategies include deductive task-oriented strategy 902, deductive explanation-oriented strategy 904, table of contents (linear) example-oriented strategy 906, inductive orientation (liner) strategy 908 and SCORM strategy 910. Learning strategies may be otherwise suitably limited in the learning management system 140 without departing from the scope of the present disclosure. In addition, all strategies may be allowed in the learning management system 140 at the global level.

Referring to FIG. 9B, example dialog screen 940 is illustrated where the author or other authorized person may constrain learning strategies for a course 301. Constraining learning strategies for a course 301 may comprise constraining learning strategies for other items of content in the course 301 (i.e., sub-course 302, learning unit 303 or knowledge item 304). The dialog screen 940 may be displayed as part of the publishing wizard. In this embodiment, the publishing wizard may be part of the repository explorer which itself may be part of the authoring environment 210.

The dialog screen 940 may list all strategies allowed at the global level by the learning management system 140. In the illustrated example, the allowed strategies are deductive task-oriented strategy 942, deductive explanation-oriented strategy 944, table of contents (linear), example-oriented strategy 946, conductive orientation (linear) strategy 948 and SCORM strategy 950. The author may select that all available strategies are valid at box 952. Alternatively, the author may select that only a subset of the allowed strategies are valid for the content by selecting one or more of strategy specific boxes 954. In one embodiment, at least one strategy must be selected by the author. In another embodiment, if at least one strategy is not selected, a default strategy of the user or learning management system 140 is utilized. Valid strategies may be otherwise selected for courses 301 without departing from the scope of the present disclosure. For example, all allowed strategies may be initially selected and the author may select specific strategies as invalid for the course 301.

Referring to FIG. 9C, example dialog screen 980 is illustrated. Dialog screen 980 lists all valid macro-strategies and micro-strategies per course version stored in the learning management system 140. The valid strategies may be stored during the content publishing process as described above, or otherwise.

Figure 10:
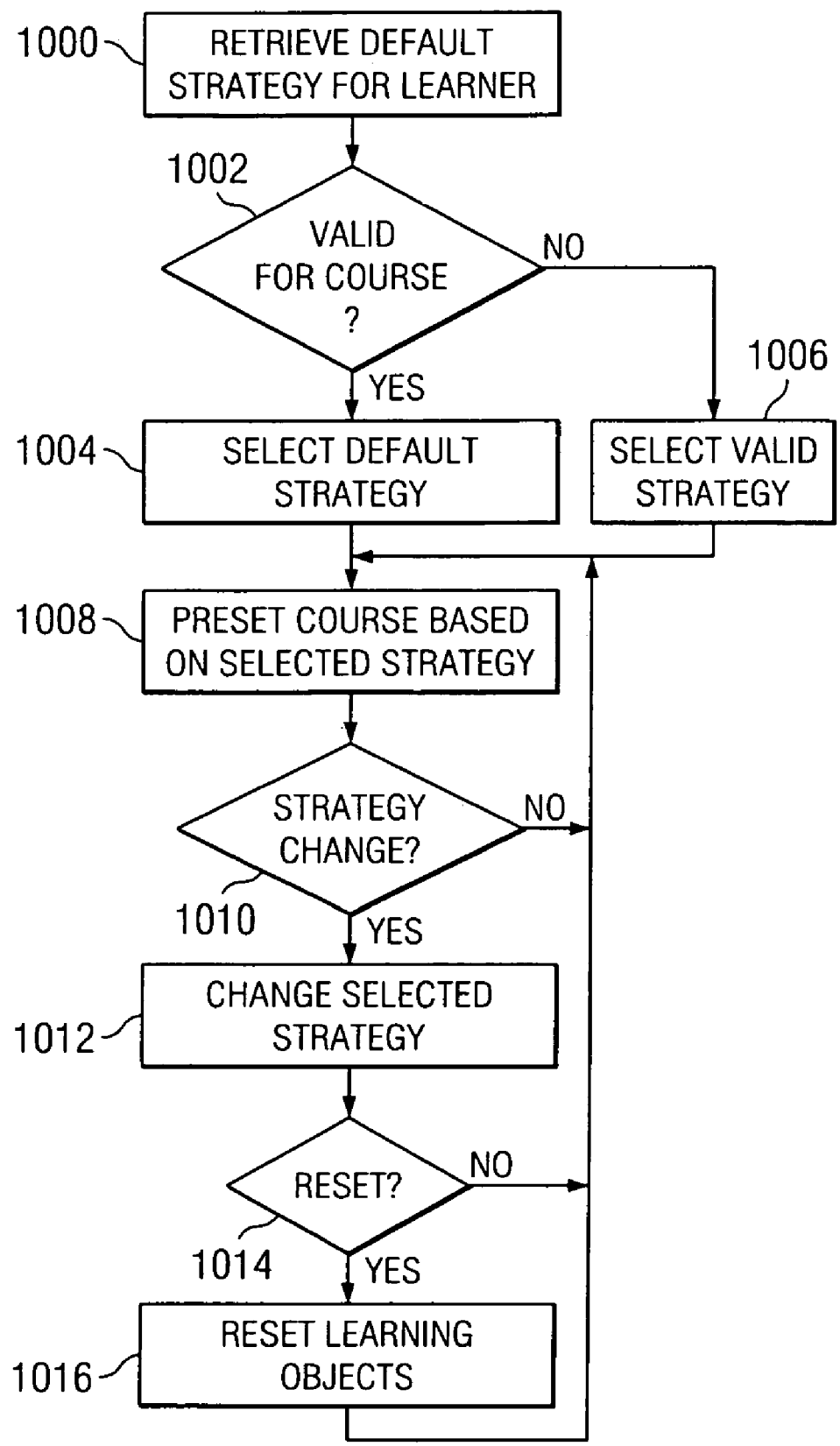
FIG. 10 illustrates an example flow diagram for changing learning strategies in the learning management system of FIG. 2 according to one embodiment of the present disclosure.

FIG. 10 illustrates a method for changing learning strategies in a learning system in accordance with one embodiment of the disclosure. Although the following description focuses on the operation of learning management system 140, environment 100 contemplates using any appropriate combination and arrangement of logical elements implementing some or all of the desired functionality. In addition, one or more of the described steps may be performed in a different order, modified, combined or omitted. Also, additional steps may be performed without departing from the scope of the present disclosure.

The method begins at step 1000 in which the content player 208 or other suitable element of the learning management system 140 retrieves a default strategy for a learner. The default strategy may be stored in a backend system or other data storage. The content player 208 may retrieve the default strategy in response to a request from the learner for presentment of an electronic training course 301. As used herein, in response to means in response to at least the identified action. Accordingly, other actions may be required for occurrence of the identified event. As described in more detail below, the learning management system 140 may provide the dialog screen 1100 illustrated in FIG. 11A to the learner to define his or her generally preferred or default learning strategy. The learner's default strategy may, for example, be stored in a backend table in the learning management system 140. In another embodiment, the learner may have no defined default learning strategy and/or may have several default strategies, each for different types of content.

Next, at decisional step 1002, the content player 208 determines if the learner's default learning strategy is valid for the course 301. The content player 208 may, in one embodiment, determine whether the default learning strategy is valid for the course 301 based on the default strategy being listed for the course 301 in the table containing the valid strategies per course version illustrated by FIG. 9C. If the learner's default strategy is valid for the course 301, the Yes branch of decisional step 1002 leads to step 1004. At step 1004, the learner's default strategy is selected for the course 301. If the learner's default strategy is not valid for the course 301, the No branch of decisional step 1002 leads to step 1006. At step 1006, a learning strategy that is valid for the course 301 is selected. Steps 1004 and 1006 lead to step 1008.

At step 1008, the content player 208 presents the course 301 based on the selected strategy. As previously described, the learning strategy is applied the course 301 and the course 301 may be navigated, at least in part, based on the learning strategy. As described in more detail below, the content player 208 may present the course 301 in the dialog screen 1140 illustrated in FIG. 11B to the learner.

Proceeding to step 1010, the learner may dynamically or otherwise during runtime change the learning strategy specially for the course 301. Thus, the learner can change the learning strategy to a strategy disparate from the originally selected strategy and/or switch between strategies for the course 301. Accordingly, the learner may maintain a generally preferred strategy for courses as well as specific strategies preferred for each of a plurality of specific courses 301. As used herein, each of means at least a subset of the identified items. As described in more detail below, the content player 208 may provide the dialog screen 1180 illustrated in FIG. 11C to the learner to change learning strategy for the course 301. In a particular embodiment, dialog screen 980 may be displayed in response to a request by the learner to change strategy. If the learner does not change the learning strategy, the No branch of step 1010 returns to step 1008 in which course 301 continues to be presented based on the previously selected learning strategy. If the learner changes the strategy for the course 301, the Yes branch of decisional step 1010 leads to step 1012. At step 1012, the content player 208 changes the selected learning strategy to the strategy switched to by the learner. The content player 208 may change the selected learning strategy by applying the newly selected strategy to the course 301 to generate a new or modified path through the course 301 for the learner. The newly selected learning strategy may be stored in a backend system or any date storage.

Next, at decisional step 1014, the content player 208 determines whether the learner additionally reset the learning progress in connection with the change in learning strategy. If the learning progress is not reset, the No branch of decisional step 1014 returns to step 1008 where the content is presented based on the newly selected learning strategy. In this case, the learner will not revisit portions of the course 301 already completed before the change in learning strategy. If the learning process is reset at decisional step 1014, the Yes branch of decisional step 1014 leads to step 1016 where the learning objects for the course 301 are reset. Step 1016 returns to step 1008 where the course 301 is played starting at a beginning based on the newly selected learning strategy.

Figure 11A:
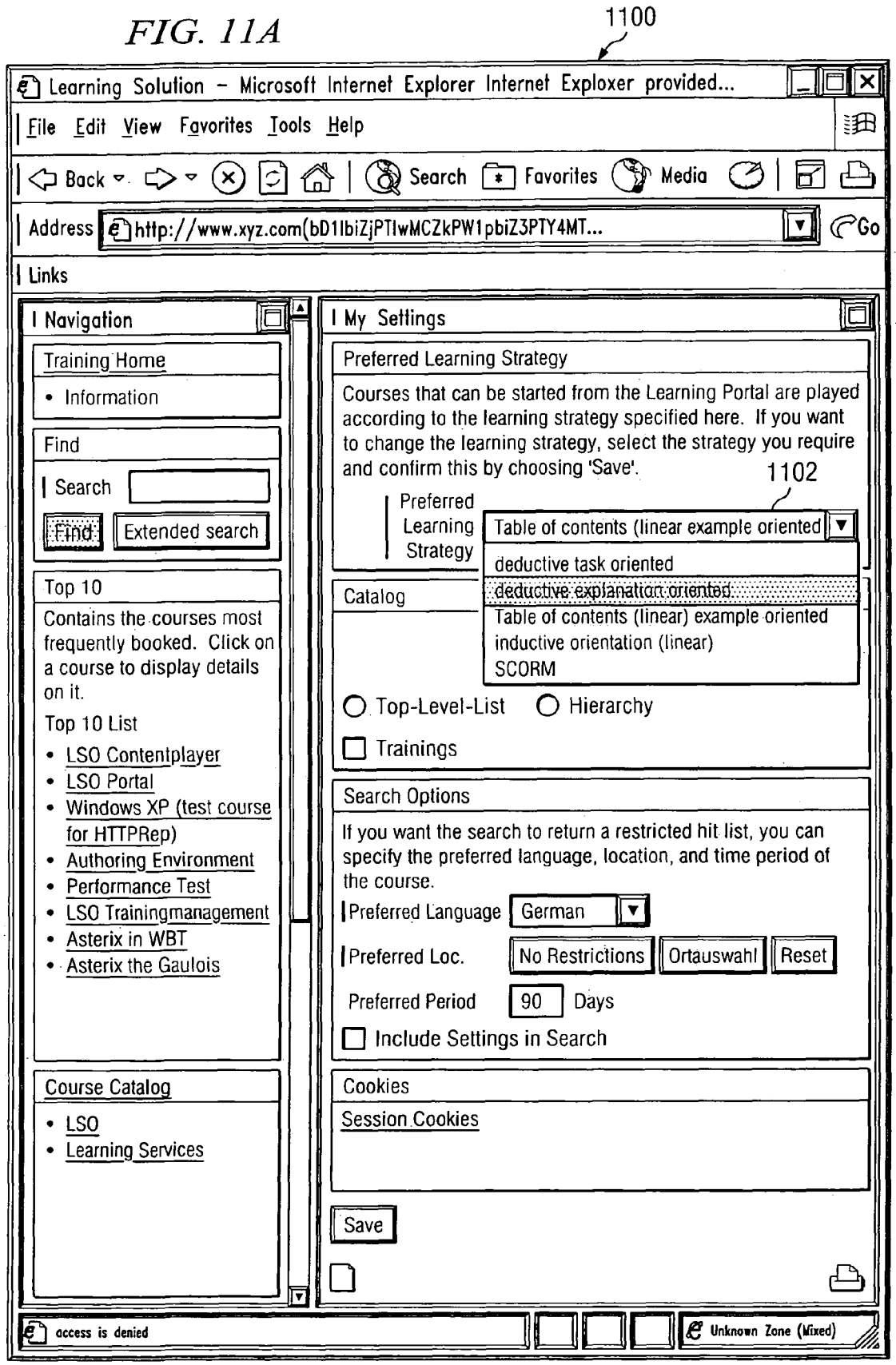
FIGS. 11A-C illustrate example dialogue screens for changing learning strategies according to one embodiment of the present disclosure.
Figure 11B:
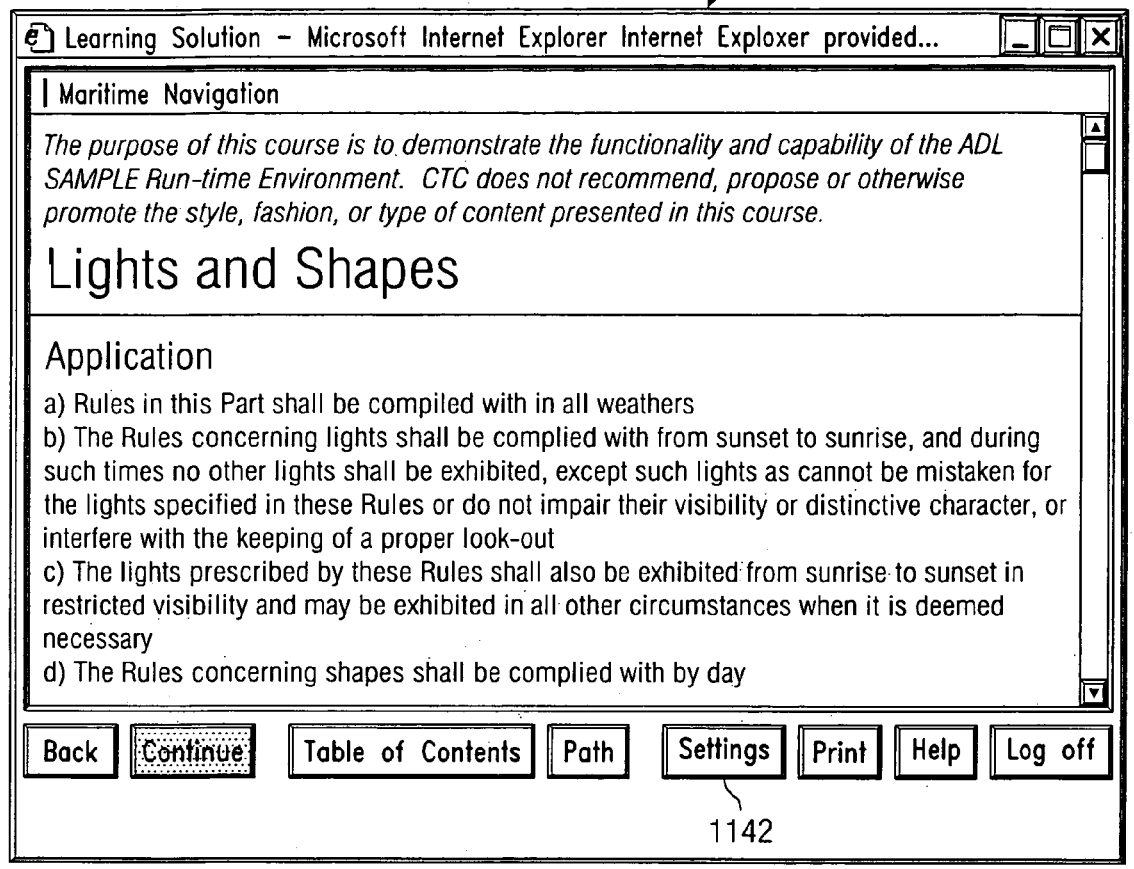
Figure 11C:
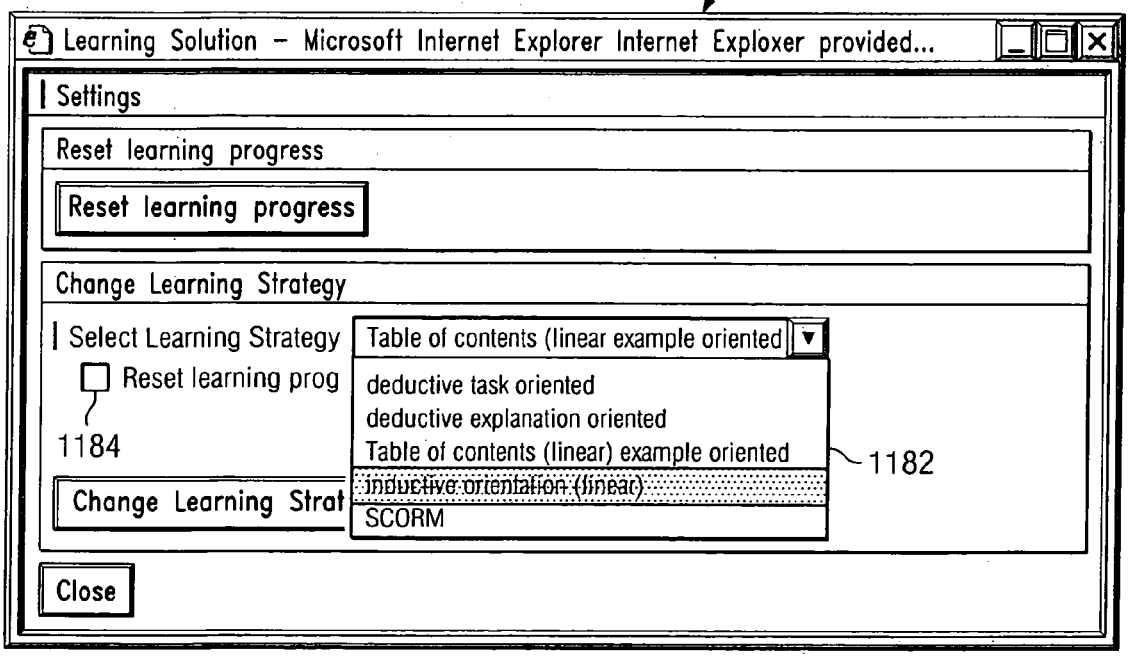

FIGS. 11A-C illustrate example dialog screens for changing or otherwise selecting learning strategies. Referring to FIG. 11A, an example dialog screen 1100 is illustrated where a learner may change his or her generally preferred learning strategy. Dialog screen 1100 may display learning strategies allowed in the learning system 140 as items 1102 for selection by the learner. As described above, the generally preferred learning strategy will be used as a default strategy where valid for a particular course.

Referring to FIG. 11B an example dialog screen 1140 is illustrated where a course 301 is presented to the learner. The course may be initially presented based on the learner's default strategy (if valid). The learner may change the learning strategy for the course 301 and also switch between valid strategies during the course 301 using settings button 1142 to bring up the settings dialog screen 1180 of FIG. 11C.

Referring to FIG. 11C, the dialog screen 1180 provides the learner with a list of valid learning strategies for the course 301 as items 1182 for selection. Dialog screen 1180 allows the learner to select between and/or change learning strategies. Dialog screen 1180 may include a learning process indicating the percentage of the course already completed by the learner. In connection with a change in learning strategy or otherwise, the learner may elect top continue the course 301 from the current point using the newly selected strategy. Alternatively, the learner may elect to reset the learning process by selecting box 1184. Upon reset, all the learning objects in the course 301 that have been reviewed or edited by the learner are reset. Also, upon a selection or change of learning strategy in dialog screen 1180, the learning management system 140 may store the a course specific strategy in a backend table or otherwise.

A number of embodiments have been described. Nevertheless, it will be understood that various modifications may be made without departing from the spirit and scope of the disclosure. Accordingly, other embodiments are within the scope of the following claims.

What is claimed is:

1. A computer-implemented method performed by one or more processors for presenting a training course stored in memory to a learner, the method comprising the following steps performed by one or more processors:

retrieving a default learning strategy associated with the learner to apply to a training course, the training course comprising a plurality of nodes defining a path for the learner;

determining the default learning strategy is a valid strategy for the training course;

applying the default learning strategy to the training course, wherein applying the default learning strategy includes presenting the plurality of nodes of the training course to the learner in an order based on the default learning strategy, the order different from the path defined by the plurality of nodes of the training course;

receiving a request from the learner to replace the default learning strategy with a disparate learning strategy while the training course is in progress;

applying the disparate learning strategy to the training course by modifying the order through the plurality of nodes for the learner such that the learner does not revisit previously visited nodes; and presenting the training course to the learner in order based on the disparate learning strategy, the order of the presented training course at least partially determined by unvisited nodes of the training course during the prior presentation.

2. The method of claim 1, further comprising:

receiving a reset request from the learner in connection with the disparate learning strategy; and resetting the training course such that all nodes for that training course are unvisited for the particular learner.

3. The method of claim 1, further comprising:

receiving a second disparate learning strategy from the learner specific to the training course;

applying the second disparate learning strategy to the training course by modifying the path for the learner; and presenting the training course in order based on the second disparate learning strategy, the order of the presented training course at least partially determined by unvisited nodes of the training course during the prior presentations.

4. The method of claim 1, wherein the learning strategy comprises at least one of a macro-strategy and a micro-strategy for the training course.

5. The method of claim 4, wherein the macro-strategy comprises at least one of table of contents, deductive, inductive, goal-based (top-down), goal-based (bottom-up), SCORM, and linear.

6. The method of claim 4, wherein the micro-strategy comprises at least one of orientation only, initial orientation, action oriented, orientation oriented, explanation oriented, task oriented, example oriented, table of contents, and SCORM.

7. The method of claim 1, wherein the disparate learning strategy comprises a validated learning strategy for the training course.

8. A learning management system, comprising:
a repository storing training courses for electronic delivery to learners;
a data storage storing a generally preferred learning strategy of the learners and storing in connection with a training course a second learning strategy preferred by the learners for the training course, the training course comprising a plurality of nodes defining a path for the learners; and
a processor operable to:
identify the generally preferred learning strategy of a learner to apply to the training course;
determine the generally preferred learning strategy is a valid strategy for the training course;
apply the generally preferred learning strategy to the training course, wherein applying the generally preferred learning strategy includes presenting the training course to the learner in an order based on the generally preferred learning strategy, the order different from the path defined by the plurality of nodes of the training course;
receive a request from the learner to replace the generally preferred learning strategy with the second learning strategy while the training course is in progress;
apply the second learning strategy to the training course by modifying the order through the plurality of nodes for the learner such that the learner does not revisit previously visited nodes; and
present the training course to the learner in order based on the second learning strategy, the order of the presented training course at least partially determined by unvisited nodes of the training course during the prior presentation.

9. The system of claim 8, further comprising a content player executed by the processor and operable to reset delivery of the training course in response to at least the learner changing the generally preferred learning strategy for the in progress training course.

10. The system of claim 8, the data storage storing in connection with each of a plurality of training courses a learning strategy preferred by the learner for the training course.

11. The system of claim 8, wherein the generally preferred learning strategy comprises at least one of a macro-strategy and a micro-strategy for the training course.

12. The system of claim 11, wherein the macro-strategy comprises at least one of table of contents, deductive, inductive, goal-based (top-down), goal-based (bottom-up), SCORM, and linear.

13. The system of claim 11, wherein the micro-strategy comprises at least one of orientation only, initial orientation, action oriented, orientation oriented, explanation oriented, task oriented, example oriented, table of contents, and SCORM.

14. The system of claim 8, wherein the learning strategy preferred by the learners for the training course comprises a validated learning strategy for the training course.

15. A tangible computer-readable article for presenting a training course to a learner, the article storing instructions operable when executed by a processor to:
retrieve a default learning strategy associated with the learner to apply to a training course, the training course comprising a plurality of nodes defining a path for the learner;
determine the default learning strategy is a valid strategy for the training course;
apply the default learning strategy to the training course, wherein applying the default learning strategy includes presenting the plurality of nodes of the training course to the learner in an order based on the default learning strategy, the order different from the path defined by the plurality of nodes of the training course;
change the order the training course is presented to the learner based on a course specific change in learning strategy requested by the learner while the training course is in progress by modifying the path through the plurality of nodes for the learner such that the learner does not revisit previously visited nodes; and
present the training course to the learner in the changed order based on the disparate learning strategy, the changed order of the presented training course at least partially determined by unvisited nodes of the training course during the prior presentation.

16. The article of claim 15, further operable to reset the course in response to at least the learner changing the learning strategy for the training course.

17. The article of claim 15, wherein the learning strategy comprises at least one of a macro-strategy and a micro-strategy for the course.

18. The article of claim 17, wherein the macro-strategies comprise at least one of table of contents, deductive, inductive, goal-based (top-down), goal-based (bottom-up), SCORM, and linear.

19. The article of claim 17, wherein the micro-strategies comprise at least one of orientation only, initial orientation, action oriented, orientation oriented, explanation oriented, task oriented, example oriented, table of contents, and SCORM.

* * * * *